United States Patent [19]

Uehara et al.

[11] Patent Number: 5,065,062
[45] Date of Patent: Nov. 12, 1991

[54] MOTOR-DRIVE INDUSTRIAL ROBOT

[75] Inventors: Satoshi Uehara, Yokohama; Yukio Ohtani, Kawasaki; Yoshiko Iriyama, Tokyo, all of Japan

[73] Assignee: Tokico Ltd., Kawasaki, Japan

[21] Appl. No.: 423,960

[22] Filed: Oct. 19, 1989

[30] Foreign Application Priority Data

Oct. 20, 1988 [JP] Japan .................. 63-265022
Oct. 19, 1989 [JP] Japan .................. 1-272422
Oct. 19, 1989 [JP] Japan .................. 1-272426

[51] Int. Cl.$^5$ .................................. H02K 16/00
[52] U.S. Cl. ............................ 310/114; 310/90; 310/112; 74/479; 227/3; 901/23; 901/49
[58] Field of Search ............. 901/23, 24, 15, 28, 901/43, 49; 414/736; 310/214, 254, 212, 261, 67 R, 52, 90, 88; 318/586; 74/479; 277/3

[56] References Cited

U.S. PATENT DOCUMENTS

| 4,651,591 | 3/1987 | Wurst | 901/28 |
| 4,771,199 | 9/1988 | Johannes | 310/90 |
| 4,922,782 | 5/1990 | Kawai | 310/114 |

FOREIGN PATENT DOCUMENTS

| 6114889 | 1/1961 | Japan . |
| 58-160077 | 9/1983 | Japan . |
| 0210209 | 8/1989 | Japan .................. 901/23 |

Primary Examiner—R. Skudy
Attorney, Agent, or Firm—Hoffmann & Baron

[57] ABSTRACT

A motor-drive industrial robot which can be used as a painting robot is mainly constructed by a direct-drive motor, a fixed portion such as a base, and a movable portion such as a rotary table, an arm etc. The direct-drive motor for driving the movable portion is constructed by a rotor and a stator. Preferably, the stator is attached to the fixed portion, while the rotor is attached to the movable portion. In order to avoid the generation of sparks in the flammable atmosphere, this robot is designed as the explosion-proof construction, so that the protective gas ie enclosed within the direct-drive motor. This protective gas is supplied into an annular space formed between the rotor and stator via a through hole formed through the stator or rotor. In addition, this annular space is sealed such that the protective gas is not leaked from the direct-drive motor.

14 Claims, 11 Drawing Sheets

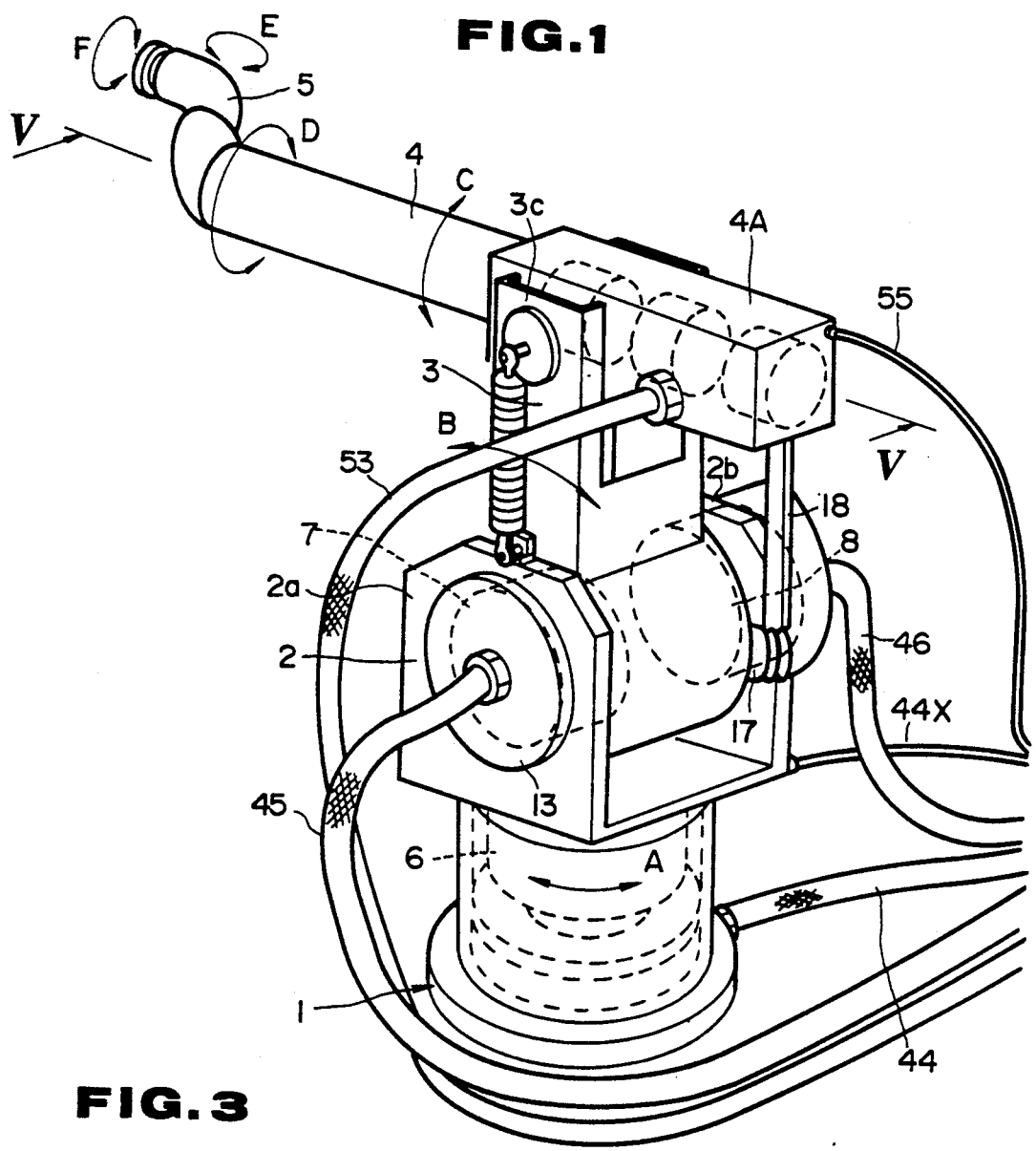
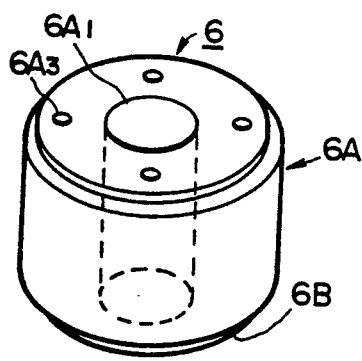

MOTOR-DRIVE INDUSTRIAL ROBOT

BACKGROUND OF THE INVENTION

1. Field of the Invention

The present invention relates to a motor-drive industrial robot which is suitable for being used as a painting or coating robot.

2. Prior Art

As the industrial robot used as the painting robot and the like, several kinds of playback type robots are developed and used. For example, as the painting robot which is positioned in the atmosphere where the paint solvent is volatile so that particles thereof are floating, the hydraulic robot is conventionally used because it can be designed by the explosion-proof construction with ease. However, this hydraulic robot is disadvantageous in that the maintenance thereof is troublesome. Therefore, recently, electric robot is used as the painting robot instead of the hydraulic robot.

Such electric robot is designed to repeatedly carry out the predetermined operation which is taught and programmed in advance (hereinafter, this operation is referred to as the teaching operation). This robot provides plenty of movable members such as a rotary table, a support, an arm, a wrist mechanism and the like. Each movable member is driven by its corresponding motor. Since each motor rotates at high speed, the rotation thereof is reduced by a speed reducer and then the reduced rotation is transmitted to the movable member as the predetermined torque. Since each movable member of this robot is driven by its motor as described above, it should be designed by the explosion-proof construction when it is used in the flammable atmosphere. For example, in the painting robot which may spray the flammable paint, its electric system at which the spark can occur is designed by the internal pressure explosion-proof construction.

In such internal pressure explosion-proof construction, each motor is stored in its housing. In addition, the cable to be coupled to the motor is inserted into a sealed tube to which the protective gas is supplied under the predetermined pressure. Further, this protective gas is supplied into the housing. This robot is designed such that its power supply is shut off when the protective gas in the tube leaks out so that its pressure decreases.

Since the above-mentioned conventional robot requires the speed reducer between the motor and movable member, such reducer works as the resisting force or repulsive force when the operator performs the foregoing teaching operation by holding the grip which is provided at the tip edge portion of the arm. So, the operator requires much physical power to overcome such resisting force in the teaching operation. In order to reduce necessary physical power in the teaching operation, a clutch mechanism can be provided between the reducer and movable member, by which the load of the reducer is canceled in the teaching operation. However, due to the provision of this clutch mechanism, the whole system of the robot should be complicated. Meanwhile, the conventional robot requires the maintenance of the reducer. However, since the rigidity of the reducer is relatively low, it becomes difficult to control the movable member at the tip edge portion of the arm with accuracy even if the rotation of the motor is controlled. In addition, in the robot providing with the clutch mechanism, the motor unit has heavy weight, which will reduce the operating characteristic of each movable member. This raises the cost for making the robot high. Further, it is difficult to seal the periphery of the motor shaft such that the protective gas does not leak out from the shaft, because the shaft rotates at high speed.

Meanwhile, the above-mentioned electric robot must provide a plenty of electric elements such as the motor, its wire etc., which should be constructed in the explosion-proof manner. Since the electric robot is constructed as the explosion-proof, it inevitably has several kinds of disadvantages as follows.

In case of the robot which adopts the internal pressure explosion-proof construction, the scavenge gas such as the air is blown into the space where the electric elements are arranged such that the internal pressure can be applied. By exhausting this scavenge gas to thereby scavenge the above-mentioned space, the external atmosphere is prevented from being in contact with the electric elements within the robot. However, in this conventional robot made by the internal pressure explosion-proof construction, the gas passage system thereof is complicated. Therefore, it takes much time to scavenge, because the pressure loss in such complicated gas passage system becomes large. In addition, the stagnation can be easily occurred in the gas flow, which will reduce the explosion-proof reliability. Further, in some cases, the motor bearing is exposed to the scavenge gas flow so that the lubricant thereof is blown out, which deteriorates the lubrication of the motor bearing.

Particularly, in case of the robot arm providing the wrist mechanism at its tip edge portion in which the motor for driving the wrist mechanism is equipped, the above-mentioned problems are remarkably occurred. In addition, the conventional technique cannot provide the solution by which the scavenge gas can be efficiently flown into the part where the motor is arranged.

Further, the conventional electric painting robot should arrange the wires such as the power line of the motor in the narrow and complicated space within the main unit thereof, so that the assembly operation thereof must be difficult. In addition, it is difficult to wire the robot with enough room to be remained. Due to such difficulties of wiring, excess force can be easily applied to the wires when the robot moves. Therefore, the reliability of the robot becomes low because there is a possibility in that the wires can be broken with ease.

SUMMARY OF THE INVENTION

It is accordingly a primary object of the present invention to provide a motor-drive industrial robot which can be constructed in the perfect explosion-proof manner but whose gas flow system can be simplified such that the stagnation of the scavenge gas flow can be avoided.

In a first aspect of the present invention, there is provided a motor-drive industrial robot comprising:

(a) a fixed portion;

(b) a movable portion provided to the fixed portion such that the movable portion can freely revolve;

(c) a direct-drive motor for directly driving the movable portion having a stator and a rotor, one of which is directly attached to the movable portion but the other is directly attached to the fixed portion, the direct-drive motor having an annular space formed between the stator and the rotor;

(d) a through hole formed through a predetermined portion of the direct-drive motor to thereby communicate with the annular space;

(e) sealing means for sealing the annular space communicating with the through hole such that a communication between the annular space and an outside air is shut down; and (f) gas supplying means for supplying a protective gas into the annular space through the through hole under a predetermined pressure.

In a second aspect of the present invention, there is provided a motor-drive industrial robot comprising:

(a) a fixed portion;

(b) a movable portion provided to the fixed portion such that the movable portion can freely revolve;

(c) a direct-drive motor for directly driving the movable portion having a stator and a rotor, one of which is directly attached to the movable portion but the other is directly attached to the fixed portion, the direct-drive motor having an annular space formed between the stator and the rotor;

(d) a first through hole formed through the stator of the direct-drive motor to thereby communicate with the annular space;

(e) a second through hole formed through the rotor of the direct-drive motor to thereby communicate with the annular space;

(f) sealing means for sealing the annular space communicating with the first and second through holes such that a communication between the annular space and an outside air is shut down; and (g) gas supplying means for supplying a protective gas into the annular space through the first or second through hole under a predetermined pressure.

In a third aspect of the present invention, there is provided a motor-drive industrial robot comprising:

(a) a fixed portion;

(b) a movable portion provided to the fixed portion such that the movable portion can freely revolve;

(c) a direct-drive motor for directly driving the movable portion having a stator and a rotor, the rotor being directly attached to the movable portion but the stator being directly attached to the fixed portion, the direct-drive motor having an annular space formed between the stator and the rotor;

(d) a first through hole formed through the stator of the direct-drive motor to thereby communicate with the annular space;

(e) a second through hole formed through the rotor of the direct-drive motor to thereby communicate with 50 the annular space;

(f) sealing means for sealing the annular space communicating with the first and second through holes such that a communication between the annular space and an outside air is shut down; and (g) gas supplying means for supplying a protective gas into the annular space through the first or second through hole under a predetermined pressure.

In a fourth aspect of the present invention, there is provided an arm of motor-drive industrial robot comprising:

(a) a wrist portion having a plurality of freedom degrees which is provided at a tip edge portion of the arm;

(b) a plurality of direct-drive motor for driving the wrist portion which are arranged along a predetermined axial line; and (c) an air space for storing rotors and stators of the plurality of direct-drive motors therein which is provided in a base portion of the arm, the air space forming a passage which sequentially communicates gaps each formed between the rotor and the stator of each direct-drive motor.

In a fifth aspect of the present invention, there is provided a motor-drive industrial robot including:

a plurality of direct-drive motors for driving a robot body, each of which is provided by each of predetermined axes, each of the plurality of direct-drive motors having a rotor and a stator which are arranged and stored in each of a plurality of hollow portions constructing a frame of the robot body, wherein hollow spaces are respectively arranged along the predetermined axes of the plurality of direct-drive motors, the hollow spaces being linked together to thereby communicate with each other by the hollow portions so that one air space is formed in the frame of the robot body.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIG. 1 is a perspective side view illustrating the motor-drive industrial robot according to a first embodiment of the present invention;

FIG. 3 is a perspective side view illustrating a DD motor used in the robot shown in FIG. 1;

DESCRIPTION OF PREFERRED EMBODIMENTS

Figure 2:
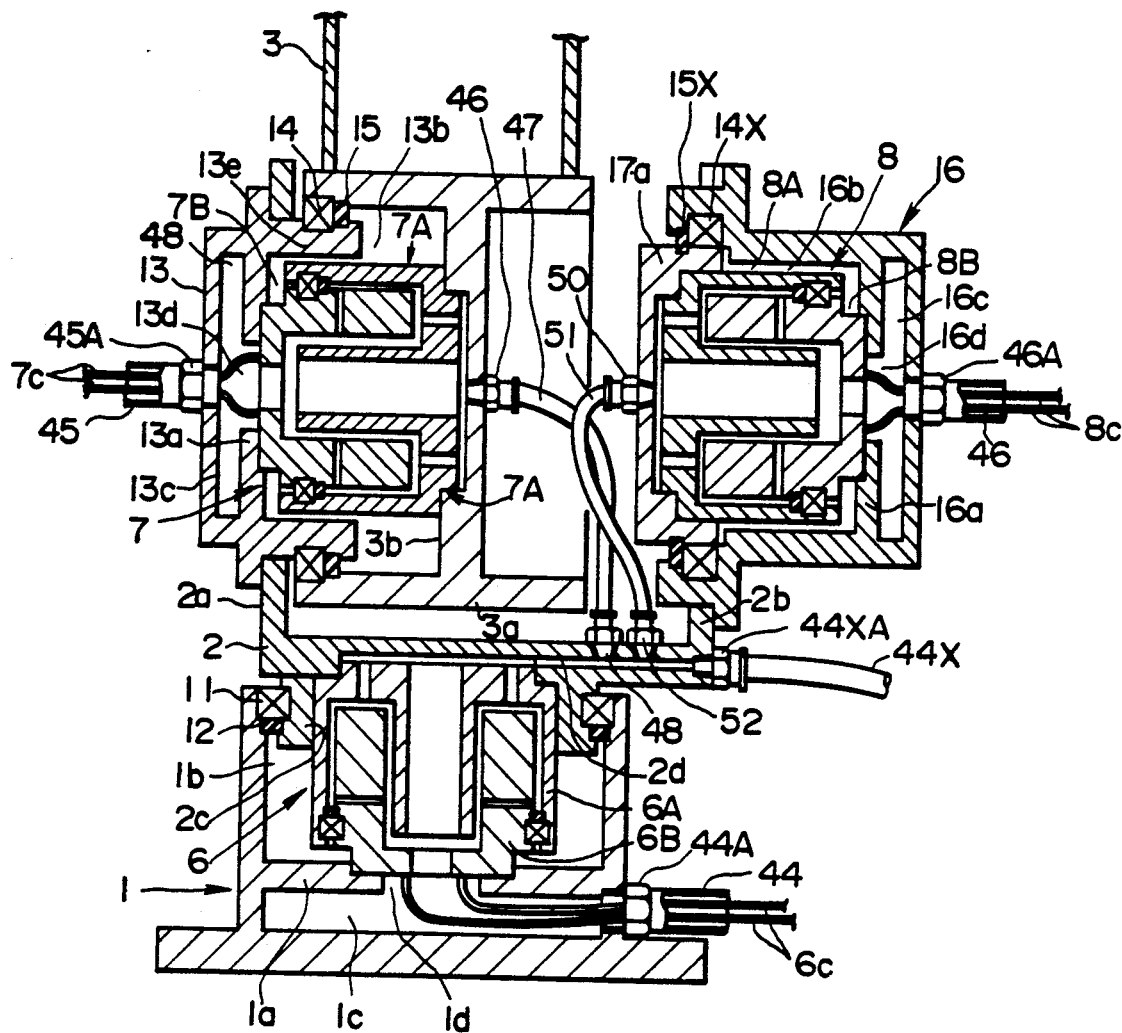
FIG. 2 is a vertical sectional view showing an essential part of the robot shown in FIG. 1.

Next, description will be given with respect to the preferred embodiments of the present invention by referring to the drawings, wherein like reference characters designate like or corresponding parts throughout the several views.

[A] FIRST EMBODIMENT

First, description will be given with respect to the first embodiment of the present invention in conjunction with FIGS. 1 to 4.

The electric robot as illustrated in FIG. 1 is the playback type robot which is used as the painting robot, for example. Mainly, this robot is configured by a base 1, a rotary table 2, a support 3, an arm 4 and a wrist mechanism 5. Herein, the rotary table 2 can freely revolve in direction A on the base 1; the support 3 stands on the rotary table 2; the arm 4 is supported at the upper edge portion of the support 3; and the wrist mechanism 5 is provided at the tip edge portion of the arm 4.

Next, 6 designates a motor for driving the rotary table 2, which is provided within the base 1 as illustrated in FIG. 2. 7 designates a motor for driving the support 3, which is provided at a bracket 2a of the rotary table 2. 8 designates a motor for driving the arm 4, which is provided at another bracket 2b. Each of these motors 6, 7, 8 is designed as the direct-drive motor (hereinafter, simply referred to as the DD motor). Since these motors have the same construction, description will be only given with respect to the DD motor 6 by referring to FIGS. 3 and 4.

Figure 4:
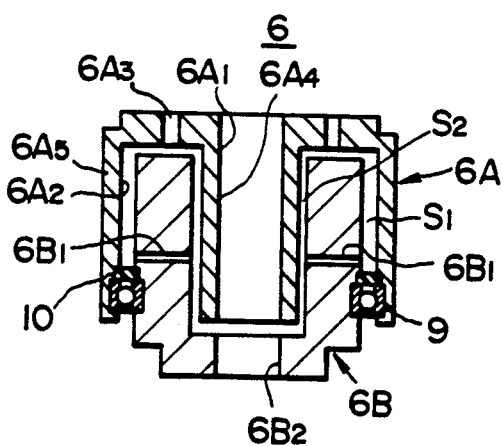
FIG. 4 is a vertical sectional view of the DD motor shown in FIG. 3.

In FIGS. 3 and 4, the rotation of the DD motor 6 is transmitted to the rotary table 2 at the transmission ratio of one to one (1:1). In other words, the rotation of the DD motor 6 is not reduced but directly transmitted as it is so that it directly drive the rotary table 2. Herein, the servo motor is used as the DD motor because its rotation is stable and made at low speed. In addition, this servo motor is advantageous in that the change-over of its speed can be made electrically, its maintenance is not troublesome and therefore it has the long lifetime.

The DD motor 6 is mainly configured by a rotor 6A and a stator 6B. This rotor 6A provides a center hole 6A1, an annular recess 6A2 and a through hole 6A3 (i.e., second through hole, see summary and claim). The center hole 6A1 is formed through the rotor 6A in its center shaft direction, and the through hole 6A3 is formed through the recess 6A2 in the periphery of the center hole 6A1. Incidentally, the center hole 6A1 is formed through the rotor 6A, but it can be formed as the hole having the bottom as shown by the dashed line in FIG. 4.

The stator 6B having the cylindrical shape is inserted into the annular recess 6A2 which is formed between an inner peripheral portion 6A4 and an outer peripheral portion 6A5 both having the cylindrical shape. This stator 6B can freely revolve by a bearing 9. A plurality of holes 6B1 are formed in the stator 6B between an outside space S1 and an inside space S2. In addition, a center hole 6B2 (i.e., first through hole, see summary and claim) formed through the stator 6B is connected to the center hole 6A1 of the rotor 6A. Therefore, the space S1 is formed between the outer peripheral portion 6A5 and stator 6B, while S2 is formed between the stator 6B and inner peripheral portion 6A4.

The DD motor 6 operates by the relatively large current, so that the heating value thereof tends to be larger as compared to the conventional motor. However, in the DD motor 6, the protective gas flows into the spaces S1, S2, by which the DD motor 6 can be efficiently cooled down. This avoids the reduction of the lifetime of the DD motor 6.

In addition, the protective gas is supplied through the center hole 6B2 having the relatively large passage area (i.e., having the large bore), which is provided at the center portion of the stator 6B of the DD motor 6. Therefore, the flow of the protective gas becomes stable and even. Such protective gas is supplied to the foregoing spaces S1, S2. Next, 10 designates an oil seal for sealing the DD motor 6 such that the space S1 between the rotor 6A and stator 6B is not in contact with the outside air.

Therefore, when the protective gas is supplied through the center hole 6B2, it is also supplied to the spaces S1, S2 through the holes 6B1 but it is prevented from being leaked from the internal part of the DD motor 6 by the oil seal 10.

In short, the DD motor 6 is designed as the closed construction by use of the oil seal 10. For this reason, it is not necessary to store such motor in the housing having the pressure-proof construction. In addition, since the DD motor 6 can directly drive the rotary table 2 without using the speed reducer, it can be constructed in the small size and light weight as comparing to the conventional motor.

Further, this DD motor is not affected by the load due to the speed reducer in the teaching operation. Therefore, the teaching operation can be carried out by the relatively small operation force. Since the DD motor does not require the speed reducer having the low rigidity, it can be controlled with accuracy.

Instead of the oil seal 10, it is possible to use the so-called Teflon ring. The Teflon ring has the relatively small friction coefficient at its surface. Therefore, the Teflon ring does not work as the large resistance when it is inserted between the rotor 6A and stator 6B. In order to obtain the higher sealing effect of the DD motor, the width of 10 should be set larger than that of the space S1. This Teflon ring has the almost square sectional shape, by which the sufficient contact area can be obtained between the rotor 6A and stator 6B so that the sufficient sealing effect can be obtained. Since the Teflon ring is used in the state where it is compressed in its radial direction, the damper effect can be obtained by its elasticity. Due to this damper effect, after the rotation of the DD motor 6 is stopped in order to stop the motions of the movable members, the rotation of the rotator 6A is stopped with accuracy by the elasticity of the Teflon ring.

As illustrated in FIG. 2, the bottom portion of the DD motor 6 having the above-mentioned construction is mounted on and fixed to a bulkhead 1a within the base 1. The inside space of the base 1 is divided into a motor storage space 1b and another space 1c. At the center of the bulkhead 1a, a hole 1d is provided in order that the space 1b is in contact with the space 1c.

The rotor 6A of the DD motor 6 is engaged and fixed to a bottom recess 2c of the rotary table 2. At this bottom recess 2c, there is provided a passage 2d which communicates to the center hole 6A1 and through hole 6A3 of the DD motor 6. In addition, the rotary table 2 is supported by the base 1 such that it can freely revolve in direction A (see FIG. 1) by a bearing 11. The oil seal 12 is inserted between the rotary table 2 and base 1. Thus, the motor storage space 1b is sealed. However, since the DD motor 6 has the closed construction, it is not required that the motor storage space 1b has the pressure-proof construction.

The motor 7 for driving the support 3 is also constructed as similar to the above-mentioned DD motor 6.

As illustrated in FIG. 2, this motor 7 is assembled between the bracket 2a of the rotary table 2 and a lower edge portion 3a of the support 3. Therefore, a rotor 7A of the DD motor 7 is fixed to a recess 3b of the support 3, while a stator 7B thereof is fixed to a cover 13 which is mounted to the bracket 2a. This cover 13 provides a bulkhead 13a at which the stator 7B is fixed. Then, a motor storage space 13b is formed between the bulkhead 13a and recess 3b, while another space 13c is formed at another side of the bulkhead 13a. At the center of the bulkhead 13a, a hole 13d is formed, by which center holes 7A1, 7B2 of the motor 7 are communicated together. This motor 7 is mounted and stored in the recess 3b of the support 3. Because, the DD motor 7 does not require the speed reducer and the protective gas can be enclosed within the inside of the motor 7.

Further, a cylindrical portion 13e projects toward the bracket 2a from the cover 13. Between this cylindrical portion 13e and the inner wall of the recess 3b of the support 3, a bearing 14 and an oil seal 15 are provided. Thus, the support can freely revolve in direction B (see FIG. 1) on the bearing 14, while the oil seal 15 seals the cylindrical portion 13e and recess 3b in the airtight manner. Therefore, the motor storage portion 13b is closed by the oil seal 15 in the airtight manner.

The motor 8 for driving the arm 4 is stored in a motor case 16 which is provided at the bracket 2b of the rotary table 2. A stator 8B is fixed to a bulkhead 16a of the motor case 16, while a rotor 8A is fixed to a cover 17a of a horizontal link 17 which covers the opening of the motor case 16. The inside space of the motor case 16 is divided into a motor storage space 16b and another space 16c by the bulkhead 16a. Further, a center hole 16d is provided at the center of the bulkhead 16 in order that the spaces 16b, 16c can communicate with each other. The horizontal link 17 is supported by a bearing 14X such that it can freely revolve. In addition, an oil seal 15X seals the motor case 16.

As described above, the stator 7B of the DD motor 7 is fixed to the cover 13, while the stator 8B of the motor 8 is fixed to the motor case 16, wherein both of the cover 13 and motor case 16 are designed as the fixed part. In fact, both of the cover 13 and motor case 16 are provided on the rotary table 2, so that they move in accordance with the rotation of the rotary table 2. However, in the basic idea of the present invention, both of 13, 16 are set as the fixed parts.

Figure 5:
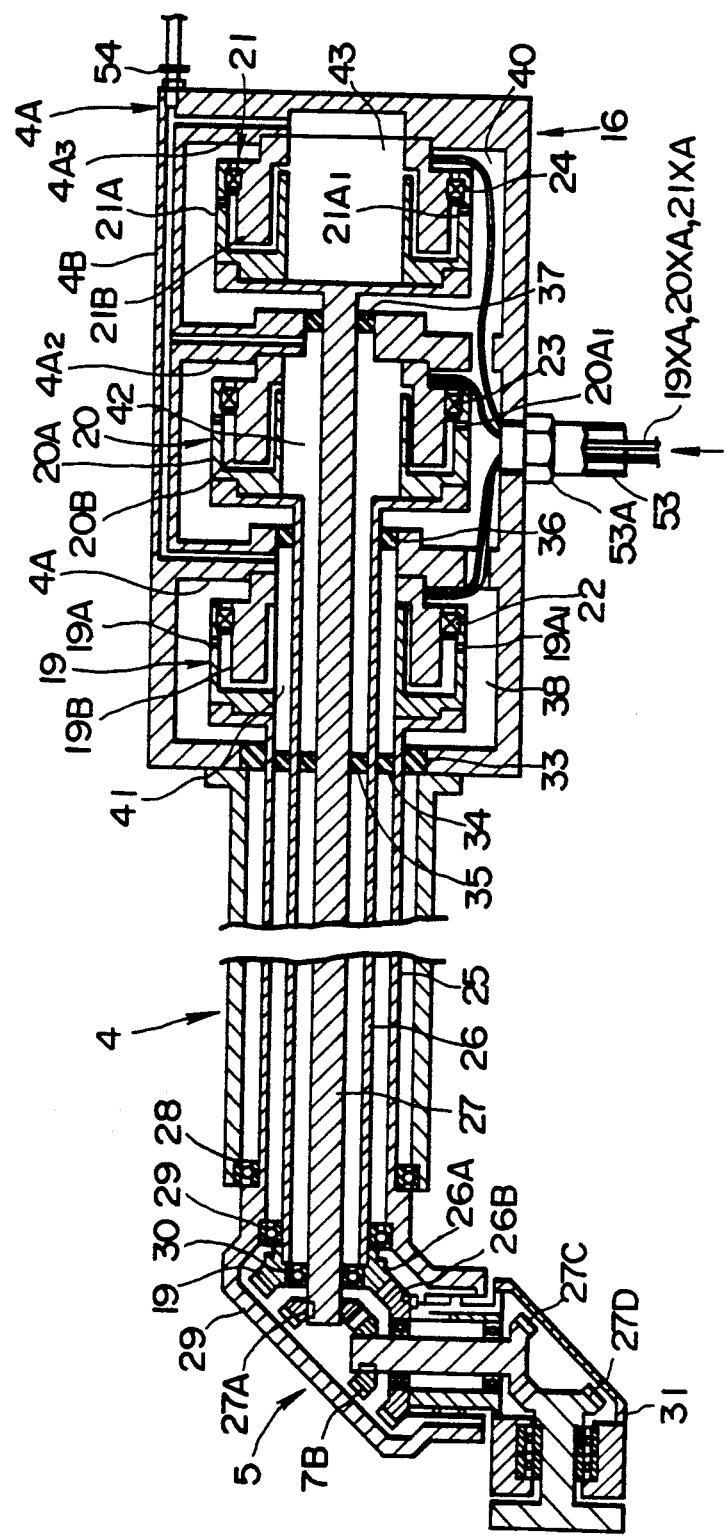
FIG. 5 is a horizontal sectional view of an arm taken along line V—V of FIG. 1.

The horizontal link 17 is provided with the cover 17a at its first edge portion, while its second edge portion extends backward as illustrated in FIG. 1. 18 designates a vertical link whose lower edge portion is linked to the second edge portion of the horizontal link 17, while its upper edge portion is linked to a motor storage space 4A which is provided at the rear edge portion of the arm 4. Therefore, the horizontal link 17 is directly driven by the DD motor 8 which rotates, so that shape of the vertical link 18 varies in the upward or downward direction of FIG. 1. Thus, the arm 4 revolves in direction C. The motor storage space 4A of the arm 4 is supported by the supporting portion 3c which is provided at the upper edge portion of the support 3. In this motor storage space 4A, motors 19, 20, 21 are stored in order to drive the wrist mechanism 5 in directions D, E, F respectively, as illustrated in FIG. 5.

Each of the motors 19, 20, 21 is designed as the DD motor having the same construction of the foregoing DD motor 6. These motors 19, 20, 21 have respective stators 19B, 20B, 21B which are respectively fixed to walls 4A1, 4A2, 4A3. Rotors 19A, 20A, 21A are respectively supported by bearings 22, 23, 24 such that they can freely revolve. In the arm 4, each of these rotors 19A, 20A, 21A is linked to each of shafts 25, 26, 27 together, wherein these shafts are arranged along the center axis of the arm 4. In other words, the shafts 25, 26, 27 are respectively linked to bearings 28, 29, 30 without inserting any speed reducers between them, so that these shafts are directly driven by the DD motors 19, 20, 21 respectively. Incidentally, the oil seals which are similar to the oil seal 10 of the DD motor 6 are provided next to the bearings 22, 23, 24.

The shaft 25 drives the wrist mechanism 5 in direction D; 26 revolves a wrist case 31 via bevel gears 26A, 26B in direction E; and 27 revolves an axis 32 via bevel gears 27A, 27B, 27C, 27D in direction F.

Next, 33, 34, 35 designate oil seals each of which seals the space between the motor storage space 4A and each of the shafts 25, 26, 27. Similarly, an oil seal 36 seals the space between the shaft 26 and wall 4A1, while another oil seal 37 seals the space between the shaft 27 and wall 4A2. Thus, the motor storage space 4A has the closed construction.

The inside of the motor storage space 4A is divided into spaces 38, 39, 40 by the walls 4A1, 4A2. The DD motors 19, 20, 21 are respectively stored in these spaces 38, 39, 40. On the surfaces of the rotors 19A, 20A, 21A of the DD motors 19, 20, 21, communication holes 19A1, 20A1, 21A1 are provided, which communicates with spaces 41, 42, 43 respectively formed between the spaces 38, 39, 40 and shafts 25, 26, 27. In FIG. 5, only two holes can be found at each of the communication holes 19A1, 20A1, 21A1, but there are more than two holes provided for each communication hole in fact. Within the walls 4A1, 4A2, 4A3, a passage 4B which communicates to the spaces 41, 42, 43 is provided.

Next, description will be given with respect to the means for supplying the protective gas (i.e., compressed air or inactive gas) to each motor. As shown in FIG. 2, a tube 44 is connected to the base 1 via a connector 44A. In this tube 44, a cable 6C to be coupled to the DD motor 6 is drawn. In addition, a tube 44X is connected to the opening of the passage 2d of the rotary table 2 via a joint 44XA. The protective gas is supplied into the space 1c within the base 1 via the tube 44, and then it is fed to the center holes 6B2, 6A1 in the DD motor 6 through the hole 1d. The protective gas in the center holes 6B2, 6A1 passes through the holes 6B1, 6A3 (see FIG. 4) and then enters into the spaces S1, S2 formed between the rotor 6A an stator 6B. Thus, the inside of the DD motor 6 is filled up with the protective gas under the predetermined pressure (which is higher than the ambient pressure), which is then passed through the passage 2d and reached to the tube 44X.

Next, when the rotor 6A rotates, the gas in the spaces S1, S2 flows toward the passage 2d from the through hole 6A3 so that it cools down the inside temperature of the DD motor 6.

In the DD motor 7, a tube 45 which includes a cable 7C therein is connected to the cover 13 via the a connector 45A. One edge of of a tuve 47 is connected to the lower edge portion 3b of the support via a joint 46, while another edge thereof is connected to the passage 2d of the rotary table 2 via a joint 48. Therefore, the protective gas supplied from the tube 45 passes through the space 13c and hole 13d and then enters into the center hole of the DD motor 7 and the spaces S1, S2 formed between the rotor 7A and stator 7B. Further, this gas passes through the tube 47 and then reaches at the passage 2d and tube 44X.

Next, in the DD motor 8, a tube 49 which includes a cable 8C therein is connected to the motor case 16 via a connector 49A. In addition, one edge of a tube 51 is connected to the cover 17a of the link 17 via a joint 50, while another edge thereof is connected to the passage 2d in the rotary table 2 by a joint 52. Therefore, the protective gas supplied from the tube 46 moves from the space 16c and hole 16d of the motor case 16 and then enters into the spaces S1, S2 formed between the rotor 8A and stator 8B of the motor 8. Further, this gas passes through the tube 51 and then reaches at the passage 2d and tube 44X.

As described above, the protective gas flows into the spaces S1, S2 of each of the motors 7, 8. Therefore, the motors 7, 8 have the internal pressure similar to that of the foregoing DD motor 6. For this reason, similar to the DD motor 6, the heat generated in the motors 7, 8 can be cooled down by this gas.

The tubes 47, 51 are respectively connected to the revolution centers of the support 3 and horizontal link 17, so that they would not vibrate so largely when the support 3 and link 17 revolve.

In the first embodiment described heretofore, the DD motors 6, 7, 8 directly drive the movable portions respectively without inserting the speed reducer between them. In addition, the center hole for supplying the protective gas is provided to each DD motor. For this reason, it is not necessary to store the DD motor within the internally-pressurized vessel, so that the motor can be constructed in the extremely small size. Therefore, the weight of the motor can be remarkably reduced as comparing to the conventional motor. These factors improve the operation characteristics of the movable portions such as the rotary table 2, support 3, arm 4 and wrist mechanism. Meanwhile, each of the motors 6, 7, 8 adopts the internal pressure explosion-proof construction so that the inside thereof is sealed by the oil seal 10. In addition, the motor storage spaces 1b, 13b, 16b are also sealed by the oil seals 12, 15, 15X. In other words, the motor and its storage space adopt the double seal construction. Further, each of the motors 6, 7, 8, 19, 20, 21 does not require the speed reducer of low rigidity, so that the teaching operation can be made with relatively small physical power of the operator. And, it is possible to make the trace control on the motion of the wrist mechanism 5 with accuracy. Since the assembly process of the speed reducer can be omitted, it is possible to raise the efficiency of the the production process of the industrial robot. Moreover, the maintenance of the speed reducer can be also omitted.

In the motor storage space 4A provided at the rear edge portion of the arm 4, 19XA, 20Xa, 21XA to be connected to the DD motors 19, 20, 21 are inserted into a tube 53, which is connected to the arm 4 via a connector 53A. On the other hand, a tube 55 is connected to the opening of the passage 4B via a joint 54. Therefore, the protective gas from the tube 53 is supplied to the spaces 38, 40 from the space 39. Thereafter, this gas passes through the holes 19A1, 20A1, 21A1 of the DD motors 19, 20, 21 and then enters into the spaces 41, 42, 43. As described heretofore, the protective gas filled in the motor storage spaces 4A passes through the passage 4B provided at the walls 4A1, 4A2, 4A3 and then reaches to the tube 55.

Therefore, each of the DD motors 19, 20, 21 does not require the speed reducer in the motor storage space 4A, while it can be designed in the small size because the protective gas can flow therein. In addition, the inside of the space which stores the DD motors 19, 20, 21 is designed as the internal pressure explosion-proof construction.

Incidentally, when the gas is leaked from some parts of the motor storage spaces of the DD motors 6, 7, 8, 19, 20, 21 or tubes 44, 45, 46, 53, such leakage is sensed by pressure sensors (not shown) which are provided at several positions of the robot, and then the power supply is shut down.

[B] SECOND EMBODIMENT

Figure 6:
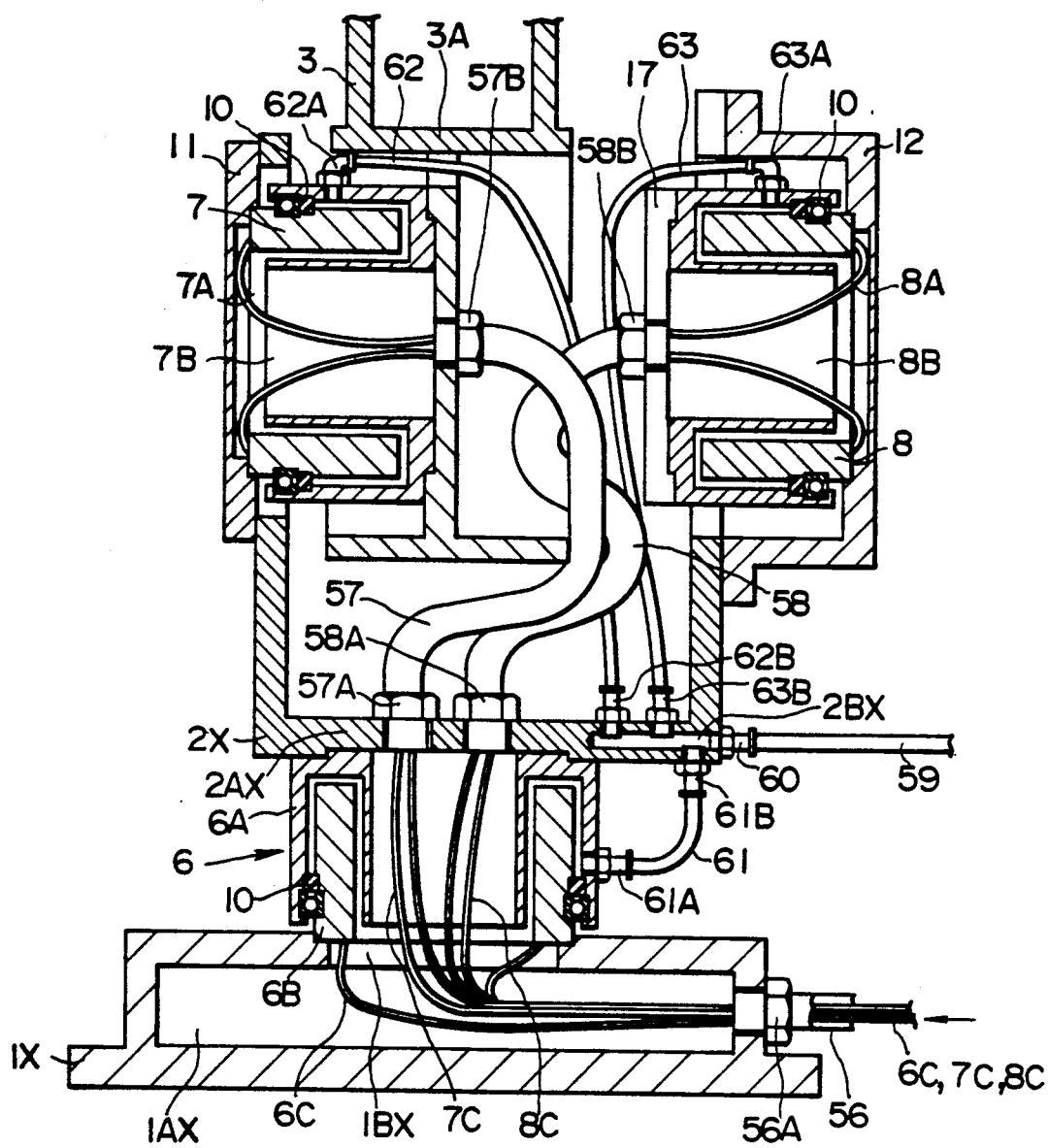
FIG. 6 is a vertical sectional view showing an essential part of a second embodiment of the present invention.

Next, description will be given with respect to the second embodiment of the present invention in conjunction with FIG. 6. In this second embodiment, several minor parts are modified as compared to the whole construction of the first embodiment described before. Hence, the description will be given with respect to these modified parts only. In FIG. 6, the cables 6C, 7C, 8C to be coupled to the DD motors 6, 7, 8 respectively are all inserted in a tube 56. This tube 56 is connected to a space 1AX in a modified base 1X by a connector 56A. The stator 6B of the DD motor 6 is fixed at an opening 1BX of the space 1AX. The rotor 6A is directly fixed at a bottom plane 2AX of a modified rotary table 2X. The cable 7C, 8C to be coupled to the motors 7, 8 are inserted through the center hole 6A1 of the rotor 6A.

One edges of tubes 57, 58 in which the cables 7C, 8C are inserted are connected to the bottom of the rotary table 2X by connectors 57A, 58A. Another edge of the tube 57 is connected to a lower edge portion 3AX of a modified support 3X by a connector 57B, while another edge of the tube 58 is connected to the horizontal link 17 by a connector 58B.

In addition, a tube 59 is connected to an opening of a passage 2BX provided at the rotary table 2X via a joint 60. One edge of a tube 61 is connected and inserted into the inside of the DD motor 6 by a joint 61A, while another edge thereof is connected to the passage 2BX via a joint 61B. Similarly, the connections between the passage 2BX and the tubes 62, 63 are made by way of tubes 62, 63 and joints 62A, 62B, 63A, 63B.

The inside parts of the DD motors 6, 7, 8 are sealed by the respective oil seals such as the oil seal 10 (see FIG. 4) in the airtight manner. Thus, the protective gas supplied from the tube 56 passes through the spaces 1AX, 1BX of the base 1X and then fills into the DD motor 6. Further, this protective gas passes through the tubes 57, 58 and then it is supplied to the DD motors 7, 8. The protective gas filled in the DD motors 6, 7, 8 reaches to the passage 2BX and tube 59 via the tubes 61, 62, 63.

Since each of the DD motors 6, 7, 8 has the closed construction by use of the oil seal 10, it is not stored in the closed vessel but is directly mounted in its motor storage space in this second embodiment as illustrated in FIG. 6. Therefore, the size and weight of the base 1X, rotary table 2X etc. can be further reduced. In addition, the cables 6C, 7C, 8C are all inserted in the tube 56. Due to the tubes 57, 58, the cables 7C, 8C to be coupled to the motors 7, 8 are provided without being exposed to the outside air. For this reason, the number of the tubes to be connected to the robot from the external device can be reduced, i.e., only two tubes 56, 59 are connected to the robot.

Therefore, when the robot operates, it is unlikely that such tubes are caught by external equipments surrounding the robot. For this reason, the robot according to the second embodiment can move safely even in the narrow space. In addition, the tubes 57, 58 are connected to the revolution center of the support 3 and link 17. Therefore, non-flexible tube can be applied as such tubes 57, 58. In this case, the reliability against the leakage of the protective gas can be further raised.

Incidentally, when the fin is provided at the rotor of the DD motor, it helps the flow of the protective gas every time the rotor rotates. In this case, the cooling effect for the DD motor can be further raised. In the foregoing first and second embodiment, the rotor is mounted to the movable portion, while the stator is mounted to the fixed portion. However, since the revolution angle of the movable portion is lower than 360 degrees, it is possible to modify these embodiment such that the rotor is mounted to the fixed portion while the stator is mounted to the movable portion.

[C] THIRD EMBODIMENT

(1) Construction of Arm

Next, description will be given with respect to the third embodiment of the present invention in conjunction with FIGS. 7 to 11. In this third embodiment, the whole appearance of the robot is similar to that of the first and second embodiments as illustrated in FIG. 1, hence, description thereof will be omitted.

Figure 9:
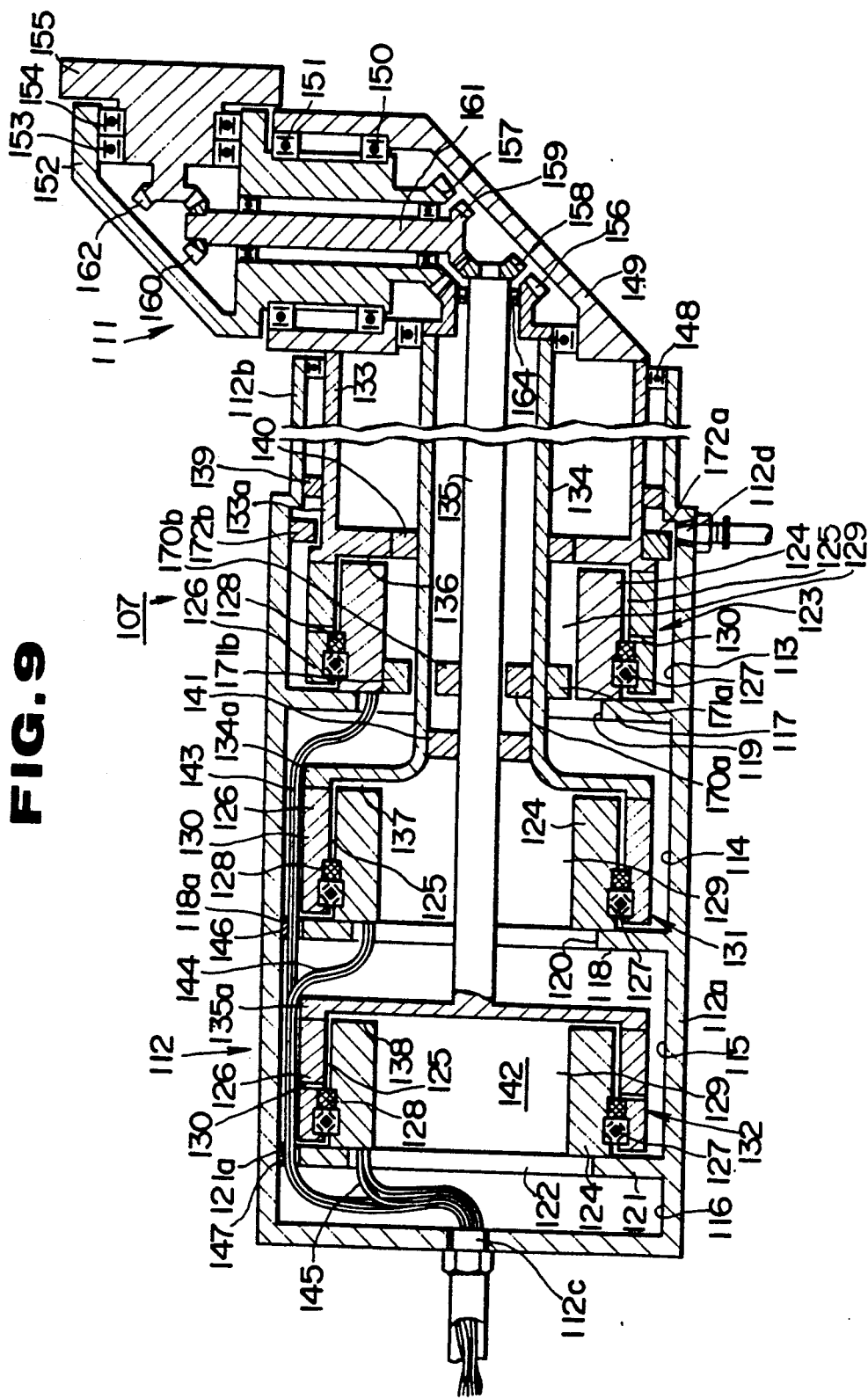
FIG. 9 is a sectional view of an arm 107 used in the third embodiment.

First, detailed description will be given with respect to an arm 107 (which corresponds to the foregoing arm 4). FIG. 9 is a sectional view illustrating the arm 107, wherein 112 designates an arm body (which is constructed by the hollow member) forming the frame of the arm 107. This arm body 112 is constructed by a box 112a and a cylindrical portion 112b. This cylindrical portion 112b projects from the box 112a and a wrist portion 111 is to be located at its tip edge portion.

The inside of the arm body 112 is divided into several sections such that motor spaces 113, 114, 115 and a gas feeding space 116 are sequentially disposed along an axial line of the arm body 112. The motor space 113 opens toward the inside of the cylindrical portion 112b. Openings 119, 120 to be positioned at the axial line of the arm body 112 are formed at partition wall 117 between the motor spaces 113, 114 or another partition wall 118 between the motor spaces 114, 115.

The gas feeding space 116 is formed along the edge plane of the box 112a. Then, an opening 122 to be positioned at the axial line of the arm body 112 is formed at a partition wall 121 between the gas feeding space 116 and motor space 115. In addition, holes 118a, 121a are respectively formed at the partition walls 118, 121 along the inside plane of the box 112a. Further, a supply port 112c to be communicating with the gas feeding space 116 is formed at the edge plane of the box 112a. Furthermore, an exhaust port 112d to be communicating with the motor space 113 is formed at certain position on the side plane of the box 112a close to the cylindrical portion 112b.

A motor 123 is arranged in the motor space 113 such that the axial line thereof coincides with that of the motor space 113.

Figure 7:
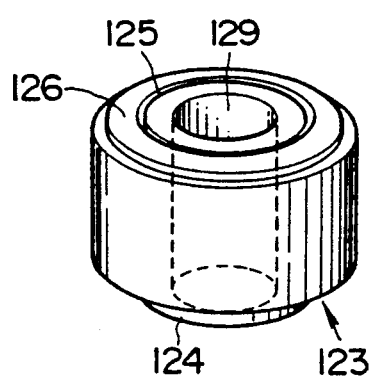
FIG. 7 is a perspective side view illustrating the direct-drive motor used in the robot according to a third embodiment of the present invention.
Figure 8:
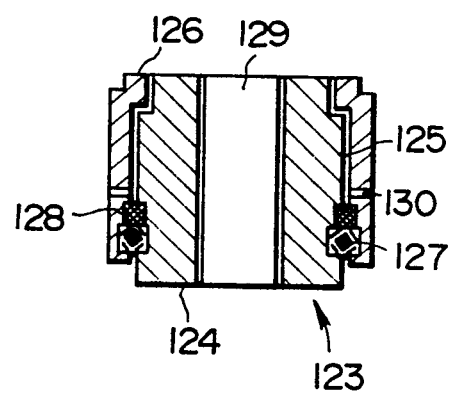
FIG. 8 is a sectional view of the direct-drive motor illustrated in FIG. 7.
Figure 10:
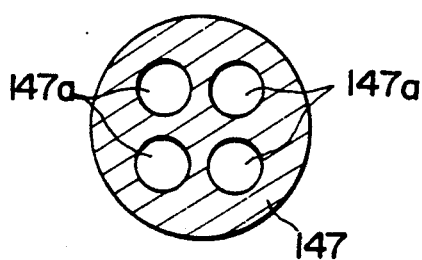
FIGS. 10 and 11 are plan view illustrating respective packings.
Figure 11:
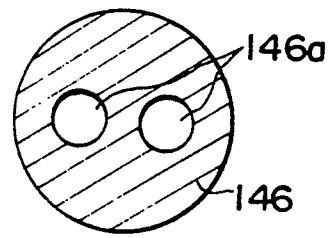

The motor 123 is designed as the direct-drive motor having low rotation speed but high torque characteristic. As illustrated in FIGS. 7, 8, this motor 123 includes a stator 124 and a rotor 126 which are formed in the concentric manner such that 124 is surrounded by 126. In addition, a gap 125 is formed between the stator 124 and rotor 126. These stator 124 and rotor 126 are supported by a bearing 127 formed between them such that these stator 124 and rotor 126 can freely revolve with each other. Further, an oil seal 128 is arranged at the opposite side of the bearing 127 and between the stator 124 and rotor 126 such that the gap between the stator 124 and rotor 126 is sealed. Furthermore, a hollow portion 129 is formed through this motor such that both edges thereof opens.

At the position in the vicinity of the bearing 127, a plurality of holes 130 are formed through the rotor 126. Due to these holes 130, the gap 125 can communicate with the outside air of the rotor 126.

This motor 123 is arranged such that its bearing 127 directs toward the partition wall 117 and its stator 124 is positioned at the edge of the opening 119. Therefore, this motor 123 is mounted to the box 112a by being fixed such that its stator 124 directs toward the partition wall 117.

A motor 131 is arranged in the motor space 114 such that the axial line thereof coincides with that of the arm body 112. Herein, the motor 131 is constructed as similar to the foregoing motor 123, hence, description thereof will be omitted by applying the same reference characters of the motor 123 to the motor 131. Similar to the motor 123, in the motor 131, its bearing 127 directs toward the partition wall 118 and its stator 124 is positioned at the edge of the opening 120. Thus, the motor 131 is mounted to the box 112a by fixing the stator 124 at the partition wall 118.

A motor 132 is arranged in the motor space 115 such that the axial line thereof coincides with that of the motor space 115. This motor 132 is also constructed as similar to the foregoing motor 123, hence, description thereof will be omitted. This motor 132 is arranged such that its bearing 127 directs toward the partition wall 121 and its stator 124 is positioned at the edge of the opening 122. Thus, this motor 132 is mounted to the box 112a by fixing the stator 124 to the partition wall 121.

Meanwhile, hollow shafts 133, 134, 135 as the drive power transmitting means of the wrist portion 11 are arranged along the axial line of the arm body 112 in the concentric manner.

Among these hollow shafts, 133 is located at the outermost side, wherein a base edge 133a thereof is fixed at the edge portion of the rotor 126 of the motor 123. The hollow shaft 134 is positioned between the hollow shafts 133, 135, wherein its base edge 134a extends through the hollow portion 129 of the motor 123 and the opening 119 of the partition wall 117. Then, this base edge 134a is fixed at the edge portion of the rotor 126 of the motor 131. Further, the hollow shaft 135 is located at the innermost side, wherein its base edge 135a extends through the hollow portion 129 of the motor 123, opening 119 of the partition wall 117, hollow portion 129 of the motor 131 and opening 120 of the partition wall 118. Then, this base edge 135a is fixed at the edge portion of the rotor of the motor 132.

Herein, gaps 136, 137, 138 are respectively formed between the stators of the motors and the base edges 133a, 134a, 135a. In addition, an oil seal 139 is inserted between the hollow shaft 133 and arm body 112, by which the motor space 113 does not communicate with the cylindrical portion 112b. Further, an oil seal 140 is inserted between the hollow shafts 133, 134, while an oil seal 141 is inserted between the hollow shafts 134, 135. These seals avoid the communications between the hollow portion 129 of the motor 123 and the inside of the hollow shaft 133 and between the hollow portion 129 of the motor 131 and the inside of the hollow shaft 134. Further, the base edge 135a of the hollow shaft 135 covers the hollow portion 129 of the motor 132.

As obvious from the above description, the box 112a, gas feeding space 116, hollow portion 129 of the motor 132, motor space 115, hollow portion 129 of the motor 131, motor space 114, hollow portion 129 of the motor 123 and motor space 113 are sequentially communicated with each other by the openings 122, 120, 119, the gaps 136, 137, 138 or the gap 125 so that one air space 142 is formed.

For the purpose of power supply or signal transmission, wires 143, 144, 145 to be coupled to the motors are inserted into the box 112a via the supply port 112c in the air space 142.

More specifically, the wire 145 for the motor 132 is connected to the stator 124 of the motor 132 through the gas feeding space 116; the wire 144 for the motor 131 sequentially passes through the gas feeding space 116, hole 121a formed at the partition wall 121 and motor space 115 and then it is connected to the stator 124 of the motor 131; and the wire 143 for the motor 123 sequentially passes through the motor space 115, hole 118a formed at the partition wall 118 and motor space 114 and then it is connected to the stator 124 of the motor 123.

The holes 118a, 121a respectively formed at the partition walls 118, 121 are provided with packings 146, 147. In order to wire the wires 143, 144 in the closed state, these packings 146, 147 respectively provide holes 146a, 147a. These packings 146, 147 work as the sealings between the wires 143, 144 and holes 118a, 121a.

The wrist portion 111 is basically constructed by cases 149, 152 and a painting gun mounting portion 155. The case 149 is mounted at the tip edge portion of the hollow shaft 133 which is supported by the bearing 148 in the cylindrical portion 112b. The case 152 is supported by the case 149 via bearings 150, 151, and it can freely rotate about the axis perpendicular to the axial line of the arm body 112. The mounting portion 155 is supported by the case 152 via bearings 153, 154, and it can freely rotate about the axis parallel to the axial line of the arm body 112.

Meanwhile, a bevel gear 156 is fixed at the tip edge portion of the hollow shaft 134, while another bevel gear 157 to be engaged with 156 is formed at the base edge portion of the case 152. Then, the revolution of the hollow shaft 134 is transmitted to the case 152 via these bevel gears 156, 157. In addition, a bevel gear 158 is fixed at the tip edge portion of the hollow shaft 135. Further, bevel gears 159, 160 are respectively formed at both edges of a transmission shaft 161 which is located on the revolution center line of the case 152. Furthermore, a bevel gear 162 to be engaged with the bevel gear 160 is formed at the base edge portion of the mounting portion 155. Thus, the revolution of the hollow shaft 135 is transmitted to the mounting portion 155 by these bevel gears 158, 159, 160, 162 and transmission shaft 161.

Incidentally, in FIG. 9, 170a, 170b, 171a, 171b, 172a, 172b designate stoppers for regulating the moving area of each axis of the wrist portion 111.

(2) Operation of Arm

Next, description will be given with respect to the operation of the arm 107 having the above-mentioned construction.

First, when the motor 123 operates, the hollow shaft 133 revolves with the rotor 126, and then the case 149 revolves with the hollow shaft 133, so that the case 152 and mounting portion 155 revolves about the axial line of the arm body 112.

In addition, when the motor 131 operates, the hollow shaft 134 revolves with the rotor 126, so that the case 152 and mounting portion 155 revolves about the axial line perpendicular to that of the arm body 112.

Further, when the motor 132 operates, the hollow shaft 135 revolves with the rotor 126, so that the mounting portion 155 revolves about the axial line parallel to that of the arm body 112.

When the wrist portion 111 operates as described above, the scavenge gas is fed into the supply port 112c under the predetermined pressure. Then, this scavenge gas flows in the inside of the air space 142 in the arm 107, and thereafter, it is exhausted. This scavenge gas removes the flammable materials such as the agent in the atmosphere from the mounting spaces of the electric appliances (concretely, motors 123, 131, 132 or wires 143, 144, 145). Or; the scavenge gas avoids the invasion of the flammable materials into the above mounting spaces. Therefore, if the spark is generated from the above-mentioned electric appliances, it is possible to avoid the firing due to the flammable materials.

More specifically, the scavenge gas fed into the gas feeding space 116 via the supply port 112c passes through the opening 122 and then flows into the hollow space 129 of the motor 132. This gas in the hollow space 129 sequentially passes through the gap 138 and another gap 125 of the motor 132, and then it flows through the hole 130 to thereby flow into the motor space 115. The gas in the motor space 115 passes through the opening 120 to thereby flow into the hollow space 129 of the motor 131, and it further passes through the gap 137 and another gap 125 of the motor 131 to thereby flow into the motor space 114. The gas in the motor space 114 passes through the opening 119 to thereby flow into the hollow space 129 of the motor 123, and it further passes through the 145 gap 136, another gap 125 of the motor 123 and the hole 130 to thereby flow into the motor space 113. Thereafter, the gas flowing into the motor space 113 is exhausted from the exhaust port 112d.

(3) Effects

The arm 107 of the robot according to the third embodiment has the following effects.

The arm 107 in the third embodiment adopts the blow-by construction. More specifically, in the arm 107, the hollow space 129 and the gap 125 between the stator 124 and rotor 126 of each motor are sequentially communicated together so that one air space 142 is formed, through which the gas can be blown by. At the both edges of this air space in the arm 107, the supply port 112c and exhaust port 112d are respectively provided. Therefore, by supplying the scavenge gas into the supply port 112c and then exhausting it from the exhaust port 112d, this scavenge gas can flow through the spaces where three motors for driving the wrist portion 111 are located and the gaps 125 without forming any stagnation in the gas flow.

Therefore, the third embodiment has the effect in that the explosion-proof function can be achieved with high efficiency and high reliability.

Since the passage of the scavenge gas has the large size and simple structure, the load for resisting the flow of the scavenge gas can be remarkably reduced. This can lower the supply pressure of the scavenge gas, which can also shorten the time required for scavenging. In addition, the scavenge gas can sufficiently flow to every parts within the arm 107.

Further, the control of the flow and pressure of the scavenge gas can be simplified. Because, by merely managing the flow and pressure with respect to all motors, the operator can make such control perfectly.

Furthermore, it is not necessary to provide any pipe, tube, hose etc. for supplying the scavenge gas, hence, the operation for the pipe arrangement can be made with ease in the assembly operation of the robot.

Moreover, the bearing 127 of each motor is arranged outside the gas flow passage, hence, this bearing 127 is not exposed to the scavenge gas flow. This avoids that the lubricant of the bearing 127 is blown and removed. Thus, it is possible to avoid the lubrication failure of each motor.

[D] FOURTH EMBODIMENT

(1) Construction

Next, description will be given with respect to the fourth embodiment of the present invention in conjunction with FIGS. 12 to 18.

Figure 12:
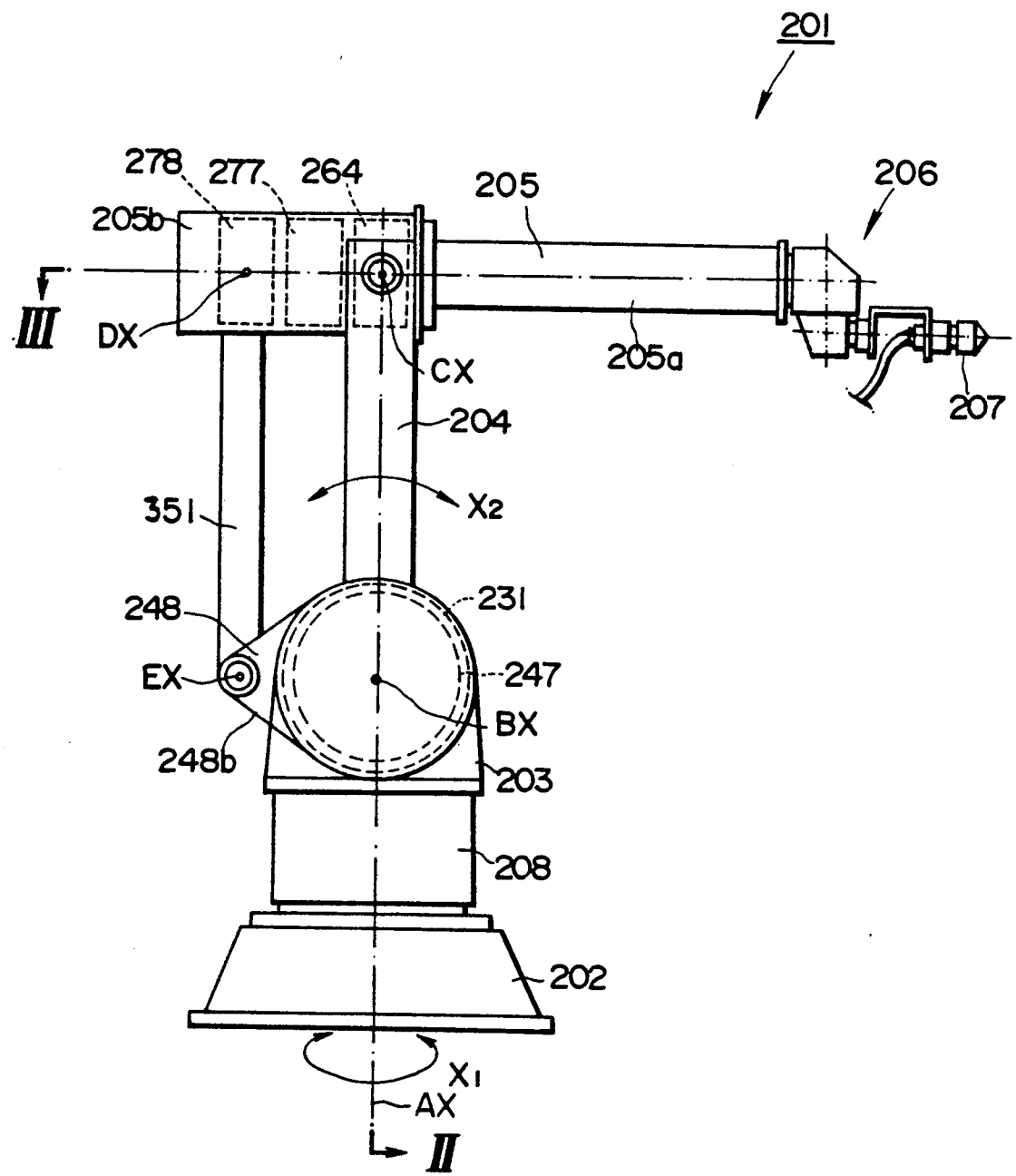
FIG. 12 is a side view illustrating the robot according to a fourth embodiment of the present invention.

In FIG. 12, 201 designates a robot body such as the electric drive painting robot according to the fourth embodiment of the present invention. This robot body 201 is basically constructed by a fixed box 202 as the base on which the robot body 201 is mounted, a rotary base 203, a first arm 204, a second arm 205 and a wrist portion 206. The fixed box 202, rotary base 203, and first and second arms 204, 205 are all of hollow construction. The rotary base 203 is mounted on the fixed box 202, which is revolved about an axial line AX perpendicular to its mounting plane on the fixed box 202. The first arm 204 is mounted at the upper portion of the rotary base 203, which is revolved about an axial line BX perpendicular to the axial line AX. The second arm 205 is mounted at the tip edge portion of the first arm 204, which is revolved about an axial line CX parallel to the axial line BX. The wrist portion 206 having three axes is provided at the tip edge portion of the second arm 205. Under control of a control unit (not shown), a painting gun 207 mounted at the wrist portion 206 is moved and its direction is changed in order to carry out the painting operation.

Next, detailed description will be given with respect to several portions of this robot according to the third embodiment.

Figure 13:
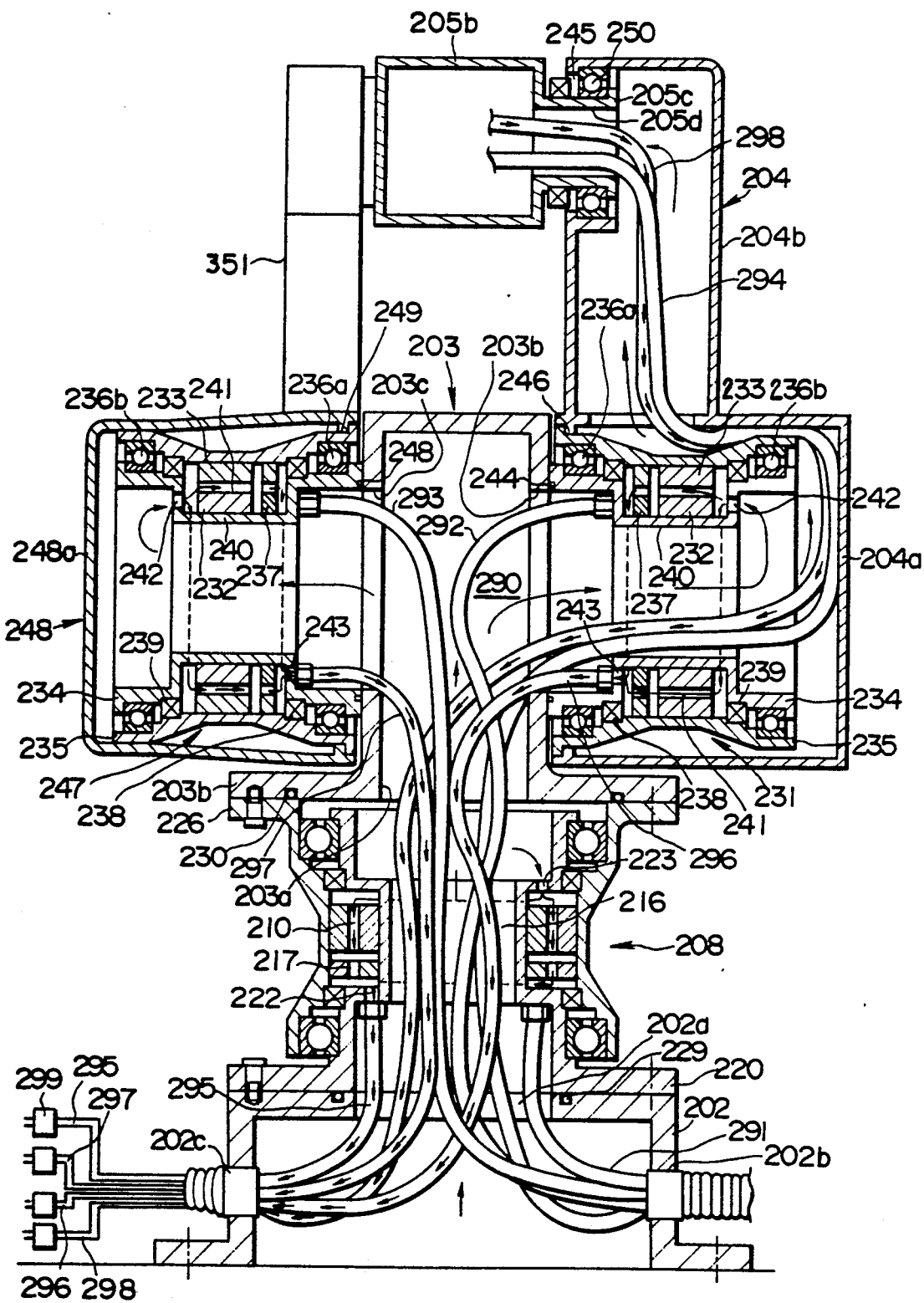
FIG. 13 is a sectional view taken along line II of FIG. 12.

As shown in FIG. 13, the fixed box 202 has the box-type structure, wherein an opening 202a is formed at its upper portion. At its side wall, a supply port 202b and an exhaust port 202c are provided. This fixed box 202 is located such that its opening 202a is located on the axial line AX shown in FIG. 12.

Figure 15:
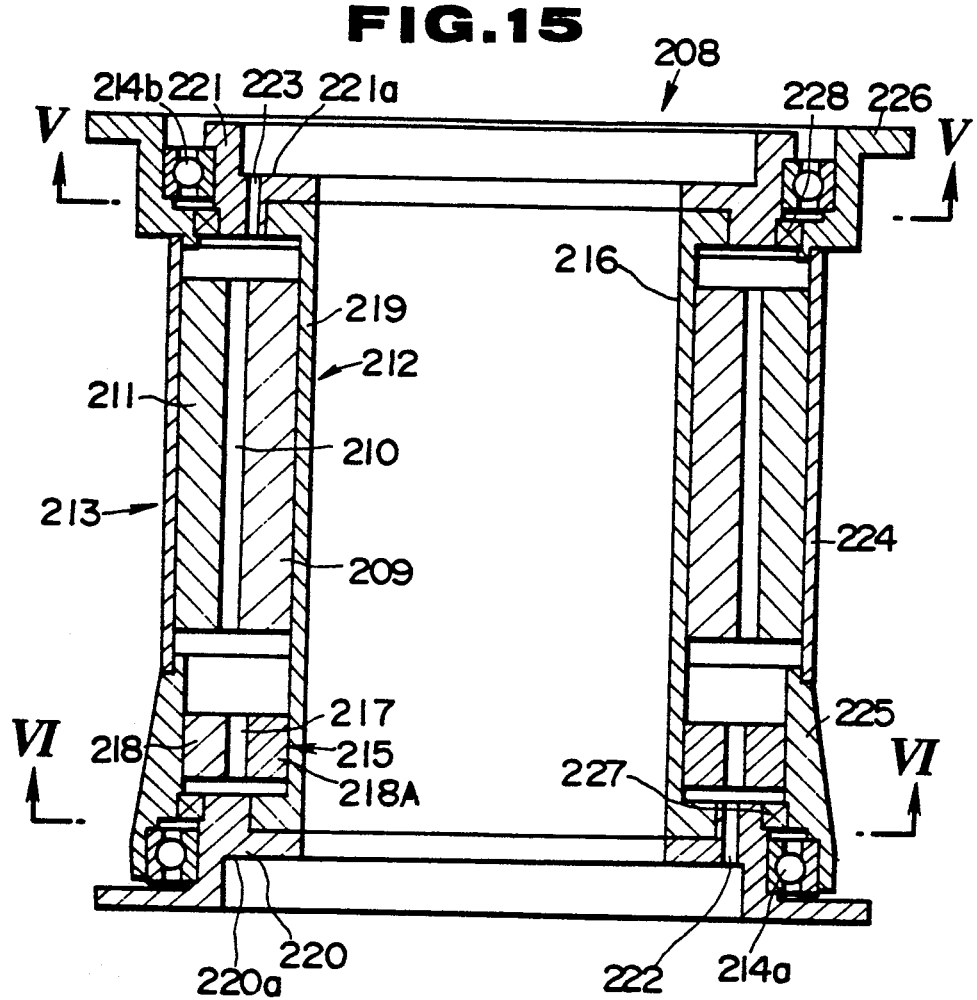
FIG. 15 is a side sectional view of a direct-drive motor used in the fourth embodiment.

Meanwhile, a motor 208 for driving the rotary base 203 is mounted at the upper portion of the fixed box 202, wherein it is the direct-drive motor having relatively low rotation speed but high torque characteristic. This motor 208, as shown in FIG. 15, is basically constructed by a cylindrical stator 209, a rotor 211, an inner cylinder 212, an outer cylinder 213, bearings 214a, 214b, a position detector 215, wherein a hollow portion 216 whose both edges open is formed on its center axial line. The rotor 211 is arranged such that it surrounds the outer periphery of the stator 209 via a gap 210 in the concentric manner. The inner cylinder 212 is fixed at the inner periphery of the stator 209, while the outer cylinder 213 is fixed at the outer periphery of the rotor 211. The bearings 214a, 214b support the inner cylinder 212 and outer cylinder 213 such that the outer cylinder 213 can freely rotate with respect to the inner cylinder 212. The position detector 215 is provided between the cylinders 212 and 213 in the concentric manner with respect to the rotor 211 of stator 209.

The position detector 215 is constructed by a cylindrical detecting portion 218A and a rotating portion 218. This rotating portion 218 is arranged in the concentric manner with respect to the detecting portion 218A such that a gap 217 is formed between the rotating portion 218 and the outside face of the detecting portion 218A. Thus, the position detector 215 outputs position information for carrying out the servo control on the motor 208.

Figure 16:
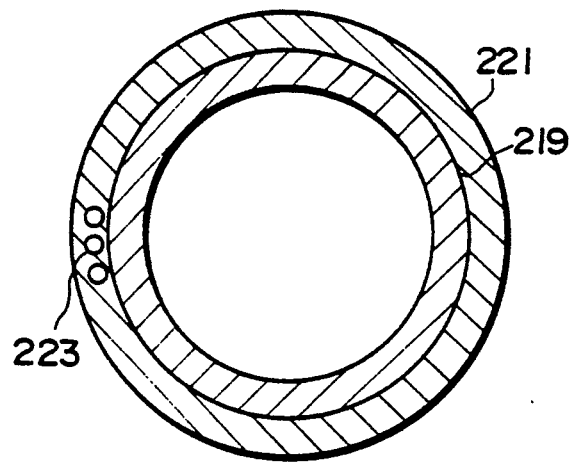
FIG. 16 is a sectional view taken along line V of FIG. 15.
Figure 17:
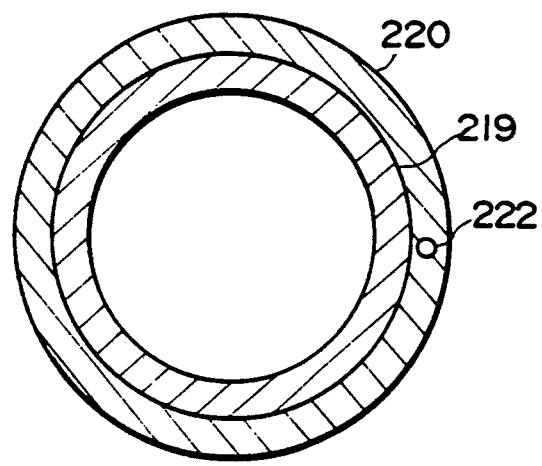
FIG. 17 is a sectional view taken along line VI of FIG. 15.
Figure 18:
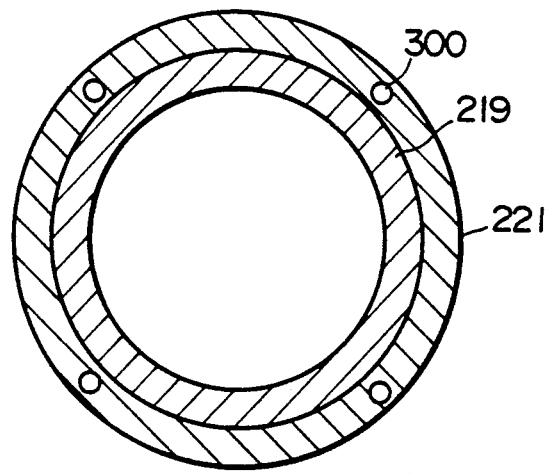
FIG. 18 is a modified example of FIG. 16.

In addition, the inner cylinder 212 is constructed by a cylindrical portion 219 and flange portions 220, 221. The cylindrical portion 219 is formed through the stator 209. The flange portions 220, 221 respectively have step portions 220a, 221a which project at both edges of the cylindrical portion 219 in the radial direction. By these step portions, the radius of each flange portion is set larger than that of the cylindrical portion 219 at its tip edge portion. In addition, through holes 222, 223 (i.e., passage) are formed through the flange portions 220, 221 at the step portions 220a, 221a in the axial direction. These holes 222, 223 communicate the hollow space 216 with the gap 210. As shown in FIGS. 16, 17, these holes 222, 223 are formed opposite to each other with respect to the axial line of the motor 208. In FIG. 16, the holes 223 are formed at the predetermined one side of the flange portion 221. However, it is possible to modify this fourth embodiment such that the holes 300 (corresponding to 223) are respectively formed at several positions such as the rectangular four positions as shown in FIG. 18.

The outer cylinder 213 is constructed by a cylindrical portion 224 and flange portions 225, 226. The cylindrical portion 224 covers the outside periphery of the rotor 211, while the flanges 225, 226, are respectively formed at both edges of the cylindrical portion 224. The foregoing bearings 214a, 214b are provided between the flange portions 225, 226 and other flange portions 220, 221.

In FIG. 15, 227, 228 respectively designate oil seals which are inserted between the flange portions 220, 221 of the inner cylinder 212 and other flange portions 225, 226 of the outer cylinder 213. These oil seals 227, 228 are located in the vicinity of the bearings 214a, 214b. Thus, the oils seals 27, 28 seal the portion between the space where the rotor 211, stator 209 or position detector 215 and the space where the bearings 214a, 214b are located.

The axial line of the motor 208 is coincided with the axial line AX. In addition, this motor 208 is arranged such that the inner cylinder 212 is located at the periphery edge of the opening 202a of the fixed box 202. By fixing the flange portion 220 to the fixed box 202, the motor 208 is mounted to the fixed box 202. Further, an O-ring 229 is provided at the joint portion between the flange portion 220 and fixed box 202. Thus, this joint portion is sealed so that the inside of the fixed box 202 can communicate with the hollow portion 216 of the motor 208 in the airtight manner.

As shown in FIG. 13, the rotary base 203 is constructed in the box-type structure, wherein an opening 203a is formed at its one plane. In addition, openings 203b, 203c are respectively formed at two side planes which face with each other and which are perpendicular to the above-mentioned one side plane. Further, a flange portion 203b is formed at the edge of the opening 203a. The rotary base 203 is arranged such that its flange portion 203b directs toward the motor 208 and the flange portion 203b covers the upper face of the motor 208. By fixing the flange portion 203b to the flange portion 226 of the motor 208, the rotary base 203 is mounted to the motor 208. In addition, an O-ring 230 is provided at the joint portion between the flange portions 203b and 226. Thus, this joint portion is sealed so that the hollow portion 216 of the motor 208 can communicate with the inside of the rotary base 203 in the airtight manner. The openings 203b, 203c of the rotary base 203 are located on the forgoing axial line BX.

Meanwhile, a motor 231 is mounted at the side wall where the opening 203b of the rotary base 203 is formed. This motor 231 is the direct-drive motor. Therefore, as similar to the foregoing motor 208 shown in FIG. 15, this motor 231 is constructed by a stator 232, a rotor 233, an inner cylinder 234, an outer cylinder 235, bearings 236a, 236b, a position detector 237 and oil seals 238, 239. On the center axial line of the motor 231, a hollow portion 240 whose both edges open is formed. Further, this motor 231 provides through holes 242, 243 which communicate the hollow portion 240 with a gap 241 formed between the stator 232 and rotor 233.

The axial line of the motor 231 is coincided with the foregoing axial line BX. In addition, the inner cylinder 234 is positioned at the edge of the opening 203b of the rotary base 203. Thus, by fixing the inner cylinder 234 to the rotary base 203, the motor 231 is mounted to the rotary base 203. Further, an O-ring 244 is provided at the joint portion between the inner cylinder 234 and rotary base 203. Thus, the above joint portion is sealed so that the inside of the rotary base 203 is communicated with the hollow portion 240 of the motor 231 in the airtight manner.

As shown in FIG. 13, the first arm 204 whose inside is formed as the hollow space is mainly constructed by a cylindrical portion 204a having its bottom and an arm body 204b having a rectangular shape. An opening is formed at one side of the cylindrical portion 204a, while another opening is formed at the same side of the arm body 204b which projects from the side plane of the cylindrical portion 204a. This first arm 204 is arranged such that the cylindrical portion 204a covers the motor 231 and the arm body 204b is located at the plane parallel to the foregoing axial line AX. The opening edge of the cylindrical portion 204a is jointed to and fixed at the outer cylinder 235 of the motor 231, so that the motor 231 is mounted to the rotary base 203.

Herein, the foregoing opening 245 is located on the foregoing axial line CX.

In addition, the joint portion between the cylindrical portion 204a and outer cylinder 235 is sealed by an O-ring 246. Thus, the hollow portion 240 of the motor 231 is communicated with the arm body 204b of the first arm 204 via the cylindrical portion 204b in the airtight manner. Except for the above-mentioned joint portion, the sufficient gap space is provided between the cylindrical portion 204a and motor 231. At this gap space, the electric wires are provided and the scavenge gas flows with small pressure loss, which will be described later.

Next, a motor 247 is mounted to the side plane of the rotary base 203 where the opening 203c is formed. Herein, this motor 247 is constructed as similar to the foregoing motor 231, hence, description thereof will be omitted. Similar to the motor 231, the axial line of the motor 247 is coincided with the axial line BX. The opening 203c of the rotary base 203 is located at the edge of the inner cylinder 234. Then, by fixing the inner cylinder 234 to the rotary base 203, the motor 247 is mounted to the rotary base 203. In addition, an O-ring 248 is provided at the joint portion between the inner cylinder 234 and rotary base 203. Thus, this joint portion is sealed so that the inside of the rotary base 203 can communicate with the hollow portion 240 of the motor 247 in the airtight manner.

Next, a link 248 is mounted at the outer cylinder 235 of the motor 247. As shown in FIGS. 12 and 13, this link 248 is constructed by a cylindrical portion 248 having its bottom and a plate portion 248b. An opening is formed at one side plane of the cylindrical portion 248, while the plate portion 248b is formed such that it projects from the side plane of the cylindrical portion 248a. This link 248 is arranged such that the cylindrical portion 248a covers the motor 247. The opening edge of the cylindrical portion 248a is jointed to and fixed at the outer cylinder 235 of the motor 247, so that the link 248 is mounted to the motor 247. The joint portion between the cylindrical portion 248a and outer cylinder 235 is sealed by an O-ring 249.

Figure 14:
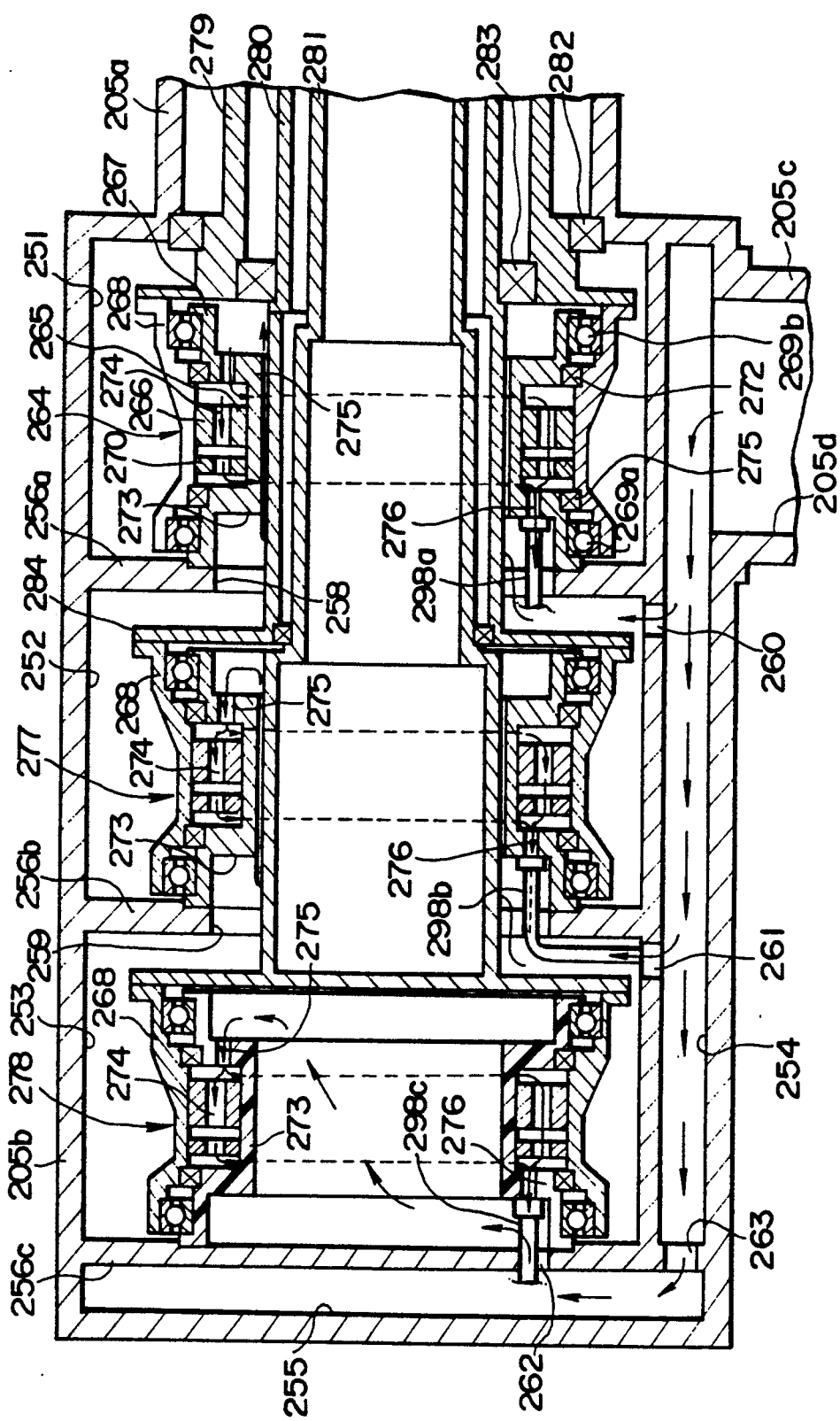
FIG. 14 is a sectional view taken along line III of FIG. 12.

As shown in FIGS. 12 and 14, the second arm 205 is constructed by an arm body 205a having the cylindrical shape, a box portion 205b and a cylindrical portion 205c. An wrist portion 206 is arranged at the tip edge portion of the arm body 205a. The box portion 205b is formed in the arm body 205a at the side opposite to another side where the wrist portion 206 is mounted. The cylindrical portion 205c is formed such that it projects from the side plane of the box portion 205b.

As shown in FIG. 13, the cylindrical portion 205c of the second arm 205 is inserted into the opening 245 of the first arm 204, and then it is mounted to the first arm 204 via a bearing 250. Thus, the second arm 205 can freely revolve about the axial line CX with respect to the first arm 204.

At the inside of the cylindrical portion 205c, an opening 205d is formed in order to communicate the inside of the first arm 204 with that of the second arm 205.

As shown in FIGS. 12 and 13, at the side opposite to the wrist portion 206 with respect to the axial line CX of the box portion 205b, a bar link 351 is mounted such that its one edge can freely revolve about an axial line DX parallel to the axial line BX. In addition, another edge of the bar link 251 is mounted to the plate portion 248b of the link 248 such that it can freely revolve about an axial line EX parallel to the axial line BX. Thus, the first arm 204, second arm 205, link 248 and bar link 351 construct the parallel link mechanism.

The inside of the box portion 205b of the second arm 205 is divided into several spaces such as motor spaces 251, 252, 253 and gas feeding spaces 254, 255 as shown in FIG. 14.

The motor spaces 251, 252, 253 are sequentially disposed on the axial line of the arm body 205a, wherein the motor space 251 opens toward the arm body 205a. In addition, openings 258, 259 which are located on the axial line of the arm body 205a are respectively formed at a partition wall 256a between the motor spaces 251, 252 and another partition wall 256b between the motor spaces 252, 253.

The gas feeding space 254 is formed along the side plane of the cylindrical portion 205c, while it opens toward the inside of the cylindrical portion 205c. Then, holes 260, 261 are respectively formed at the partition wall between the gas feeding space 254 and motor spaces 252, 253. In addition, the gas feeding space 255 is formed along the edge plane of the box portion 205b. Further, a hole 262 is formed at a partition wall 256c between the gas feeding space 255 and motor space 253, while another hole 263 is formed at a partition wall between the gas feeding spaces 254, 255.

In the motor space 251, a motor 264 is arranged such that its axial line is coincided with that of the arm body 205a.

This motor 264 is the direct-drive motor. As similar to the motor 208 shown in FIG. 15, this motor 264 is constructed by a stator 265, a rotor 266, an inner cylinder 267, an outer cylinder 268, bearings 269a, 269b, a position detector 270 and oil seals 271, 272. In addition, a hollow portion 273 whose both edges open is formed on the center axial line of the motor 264. Further, this motor 264 is provided with through holes 275, 276 (i.e., passage) which communicate between the hollow space 273 and a gap 274 formed between the stator 265 and rotor 266.

The motor 264 is arranged such that its inner cylinder 267 is positioned at the edge of the opening 258. By fixing this inner cylinder 267 to the partition wall 256a, the motor 264 is mounted to the box portion 205b.

In the motor space 252, a motor 277 is arranged such that its axial line is coincided with that of the arm body 205a. Herein, this motor 277 is constructed as similar to the foregoing motor 264, hence, description there of will be omitted. Similar to the motor 264, the inner cylinder 267 of the motor 277 is located at the edge of the opening 259. By fixing the inner cylinder 267 to the partition wall 256b, the motor 277 is mounted to the box portion 205b.

In the motor space 253, a motor 278 is arranged such that its axial line is coincided with that of the arm body 205a. Herein, this motor 278 is constructed as similar to the foregoing motor 264, hence, description thereof will be omitted. By fixing the inner cylinder 267 of the motor 278 to the partition wall 256c, the motor 278 is mounted to the box portion 205b.

Along the axial line of the second arm 205, hollow shafts 279, 280, 281 which work as the drive power transmitting means of the wrist portion 206 are arranged in the concentric manner.

Among these hollow shafts, 279 is located at the outermost side. The edge portion of the hollow shaft 279 is fixed at the edge portion of the outer cylinder 268 of the motor 264. The hollow shaft 280 is located between the other shafts 279, 281. The edge portion of the hollow shaft 280 extends through the hollow portion 273 of the motor 264 and the opening 258 of the partition wall 256a, and then it is fixed at the edge portion of the outer cylinder 268 of the motor 277. The hollow shaft 281 is located at the innermost side. The edge portion of this hollow shaft 281 extends through the hollow portion 273 of the motor 264, opening 258 of the partition wall 256a, hollow portion 273 of the motor 277 and opening 259 of the partition wall 256b, and then it is fixed at the edge portion of the outer cylinder 268 of the motor 278.

In addition, an oil seal 282 is inserted between the hollow shaft 279 and box portion 205b, which breaks the communication between the motor space 251 and arm body 205a. Further, an oil seal 283 is inserted between the edge of the hollow shaft 279 and hollow shaft 280, while another oil seal 284 is inserted between the edge of the hollow shaft 280 and hollow shaft 281. Thus, the communication between the hollow portion 273 of the motor 264 is broken, while the communication between the hollow portion 273 of the motor 277 and hollow shaft 280 is also broken. The edge of the hollow shaft 281 which directs toward the box portion 205b does not open. This breaks the communication between the hollow portion 273 of the motor 278 and hollow shaft 281.

As obvious from the above description, the hollow portions 216, 240, 273 are respectively formed at the motors 208, 231, 247, 264, 277, 278 for driving the axes of the robot body 201, and these are communicated with each other by the hollow members constructing the frame of the robot, such as the fixed box 202, rotary base 203 and inside space of the box portion 205b of the arms 204, 205 so that one air space 290 is formed.

Hence, wires 291, 292, 293, 294 and hoses 295, 296, 297, 298, are provided in this air space 290. In this case, these wires are used for the power supply or signal transmission and they are inserted into the fixed base 202 from the supply port 202b, wherein they are coupled to each motor. On the other hand, the hoses are used for exhausting the scavenge gas.

More specifically, the wire 291 for the motor 208 is inserted through the fixed box 202 and then connected to the inner cylinder 212. The wires 292, 293 for the motors 231, 247 sequentially pass through the fixed box 202, hollow portion 216 of the motor 208 and rotary base 203 so that they are respectively connected to the inner cylinders 34 of the motors 231, 234.

In addition, the the wire 294 for the motors 264, 277, 278 sequentially pass through the fixed box 202, hollow portion 216 of the motor 208, rotary base 203, hollow portion 240 of the motor 231, first arm 204, opening 205d of the second arm 205, and then it is guided into the gas feeding space 254. In this gas feeding space 254, this wire 294 branches into three small wires. These wires respectively pass through the holes 260, 261, 262 or openings 258, 259, and then they are connected to the inner cylinders 267 of the motors 264, 277, 278.

The hose 295 is connected to the hole 222 of the motor 208, and it passes through the inside of the fixed box 202 and then it is guided to the outside from the exhaust port 202c. The hose 296 is connected to the motor 231, while the hose 297 is connected to the hole 243 of the motor 247. These hoses sequentially pass through the rotary base 203, hollow portion 216 of the motor 208 and fixed box 202, and then they are guided to the outside from the exhaust port 202c.

One edge of the hose 298 branches into three small hoses 298a, 298b, 298c, which are connected to the holes 276 of the motors 264, 277, 278. Then, these three hoses pass through the openings 258, 259 or holes 260, 261, 262, and then they are guided into the gas feeding spaces 254, 255. Thereafter, these three hoses are combined together into one hose, which sequentially passes through the opening 205d, first arm 204, hollow portion 240 of the motor 231, rotary base 203, hollow portion 216 of the motor 208 and fixed box 202 and then finally guided to the outside from the exhaust port 202c.

At the outside of the robot body 201, pressure switches 299 are provided to the hoses 295, 296, 297, 298. Thus, when the exhaust pressure is relatively low, the signal is transmitted to the control unit (not shown).

In this case, the control unit stops the operation of the robot body 201, for example.

(2) Operation

Next, description will be given with respect to the operation of the robot according to the fourth embodiment as described above.

First, when the motor 208 is activated, the outer cylinder 213 and rotary base 203 revolve with the rotor 211, so that the first arm 204 or second arm 205 as a whole revolves about the axial line AX.

When the motor 231 is activated, the outer cylinder 135 and first arm 204 revolve with the rotor 233, so that the second arm 205 mounted to the first arm 204 revolves about the axial line BX. At this time, when the motor 247 stops revolving, the style of the second arm 205 is not changed.

When the motor 247 is activated, the outer cylinder 235 and link 248 revolve with the rotor 233. This revolution is transmitted to the second arm 205 via the bar link 351, so that the second arm 205 revolves about the axial line CX.

When the motors 264, 277, 278 are activated, the hollow shafts 279, 280, 281 respectively revolve with the rotor 266, so that each axis of the wrist portion 206 operates.

The foregoing control unit controls the motor operation to thereby control the robot body 201.

When the robot body 201 operates as described above, the scavenge gas is fed into the supply port 202b under the predetermined pressure. This gas flows into the air space 290 and then it is exhausted. Thus, the flammable materials such as the agents in the atmosphere is removed from the spaces where the electric appliances of the robot body (i.e., the stator, rotor and wire of each motor) are arranged. Or, the scavenge gas avoids that the flammable material flows into the above-mentioned space. This avoids the firing of the flammable material even when the spark is generated in the electric appliance.

More specifically, the scavenge gas is fed into the fixed base 202 from the supply port 202b, and then it flows into the hollow portion 216 of the motor 208 through the opening 202a. The gas flowing into the hollow portion 216 partially passes through the hole 223, gap 210 and hole 222 so that it is exhausted from the hose 295. The remaining gas flows into the rotary base 203 and then passes through the openings 203b, 203c, from which it is flown into the hollow portions 240 of the motors 231, 247. The gas flowing into the hollow portion 240 of the motor 247 passes through the hole 242 of the motor 247, gap 241 and hole 243, and thereafter, it is exhausted from the hose 297. The partial flow of the gas flowing into the hollow portion 240 of the motor 231 passes through the hole 242 of the motor 231, gap 241 and hole 243, and thereafter, it is exhausted from the hose 296. Other flow of the gas passes through the first arm 204, and then it flows into the gas feeding space 254 of the box portion 205b.

The partial flow of the gas flowing into the gas feeding space 254 passes through the hole 260 and then flows into the motor space 252. This gas passes through the opening 258, hollow portion 273 of the motor 264 and hollow shaft 280, and then it is exhausted from the hose 298a via the hole 275, gap 274 and hole 276. Other partial gas flows into the motor space 253 through the hole 261, and then it is exhausted from the hose 298b via the hole 275 of the motor 277, gap 274 and hole 276.

The other gas flows into the hollow portion 273 of the motor 278 through the hole 262, and then it is exhausted from the hose 298c through the hole 275 of the motor 278, gap 274 and hole 276.

(3) Effects

The robot according to the fourth embodiment has the following effects.

The robot body 201 adopts the blow-by structure so that the air space 290 is formed by communicating the hollow portions 216, 240, 273. This air space is used as the main flow channel, through which the scavenge gas flows through the spaces where the electric appliances, i.e., charge portion of each motor (i.e., stator and rotor) and each wire are provided. In addition, the passage of the scavenge gas is relatively large, so that the scavenging can be made with ease.

Thus, the resistance load of the scavenge gas can be remarkably reduced. In addition, the pressure at which the scavenge gas is supplied can be lowered so that the time requiring for the scavenging can be shortened. Further, the scavenge gas can be sufficiently supplied to each portion in the robot.

In addition, each wire and pipe can be provided through the air space 290, but they are arranged at the rotation center line of the movable portion such as the motor portion and articulation portion. Hence, these does not move so much with the motion of the robot body 201. This can raise the reliability against the breaking of the wires etc.

Further, the scavenge gas blows by the gap between the rotor and stator, and then it is exhausted by each motor. Therefore, it is possible to manage the flow and pressure of the scavenge gas.

Furthermore, the hole for guiding the scavenge gas at the gap between the stator and rotor of each motor is positioned opposite to the hole to be connected to the hose for exhausting the scavenge gas from the gap with respect to the axial line of the motor. Thus, the scavenge gas can flow in the gap without any deviation, which can raise the reliability against the explosion-proof function.

Finally, the bearing which works as the bearing of each motor is arranged within the hollow portion of each motor, while the bearing which forms the articulation is located at the outside of the opening of each articulation. Thus, the bearing is prevented from being exposed to the scavenge gas flow. For this reason, the lubrication failure cannot occur because the lubricant of the bearing would not be blown by the scavenge gas.

This invention may be practiced or embodied in still other ways without departing from the spirit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. An arm assembly for a motor-drive industrial robot comprising:
   (a) an arm;
   (b) a wrist portion movably mounted to a tip edge portion of said arm;
   (c) a plurality of direct-drive motors for driving said wrist portion and which are arranged along a predetermined axial line, said motors each including a rotor, a stator, and a gap defined between the rotor and stator;

(d) an air space defined within said arm which contains said rotors and stators of said plurality of direct-drive motors, said air space forming a passage which sequentially communicates with said gaps between said rotor and said stator of each direct-drive motor;

(e) means for flowing a scavenge gas into said air space and through said respective gaps; and (f) means for exhausting said scavenge gas from said air space.

2. An arm assembly according to claim 1 including at least one partition within said air space which divides said air space into a plurality of motor spaces, each of said plurality of motor spaces including one of said plurality of direct-drive motors, a plurality of hollow portions being formed by each of said motors along said predetermined axial line, each of said hollow portions being contained, respectively, in each respective motor space, each motor space communicating respectively with one of said hollow portions via said respective gaps.

3. An arm assembly according to claim 1 including a supply port and an exhaust port positioned in opposing relation to each other at opposite ends of one of said gaps such that scavenge gas can flow in a predetermined direction through said gap.

4. An arm assembly as described in claim 1 including a first hollow shaft secured to one of said direct-drive motors and a second hollow shaft secured to another of said direct-drive motors, said hollow shafts being arranged concentrically for driving said wrist portion, said hollow shafts being rotatable upon rotation of the respective rotors of said motors to which said hollow shafts are respectively secured, and a seal positioned between said hollow shafts, said seal preventing fluid communication between a space between said shafts and said air space within said arm.

5. A motor-drive industrial robot including:

a frame;

a plurality of direct-drive motors within said frame for driving a robot body, each of said plurality of direct-drive motors having a rotor and a stator and a hollow portion defined therein;

said hollow portions of said direct-drive motors being respectively arranged along predetermined axes of said plurality of direct-drive motors, said hollow portions being in fluid communication with each other so that one air space is formed in said frame of said robot body;

means for flowing a scavenge gas into said air space, and means for exhausting the scavenge gas from said air space.

6. A robot as described in claim 5 wherein said motors each include a gap defined between the respective rotors and stators thereof, an inflow port for admitting scavenge gas from said air space into said gap, and an outflow port through which the scavenge gas can be exhausted from said gap.

7. A robot as described in claim 6 wherein said means for exhausting includes a plurality of tubes connected, respectively, to the outflow ports of said motors.

8. A robot as described in claim 6 including a plurality of wires connected to said motors, said wires extending through said air space.

9. A robot as described in claim 6 wherein each of said motors includes a first cylinder fixed to said stator and a second cylinder fixed to said rotor, and bearings supporting the first and second cylinders such that the second cylinder is freely rotatable with respect to the first cylinder, said motor including sealing means for sealing off said bearings with respect to said stator and rotor.

10. A motor-drive industrial robot comprising:

a fixed portion;

a movable portion mounted to said fixed portion such that said movable portion can freely revolve;

a direct-drive motor for driving said movable portion, said motor including a stator and a rotor, said rotor being attached to said movable portion, said stator being attached to said fixed portion, and an annular space formed between said stator and said rotor;

gas supplying means for flowing a protective gas through said annular gap; and means for exhausting the protective gas from said annular gap such that the gas supplied to said annular gap is caused to flow in a predetermined direction.

11. A robot as described in claim 10 wherein said motor includes a center axis and a hollow portion formed along said center axis, said gas supplying means including means for flowing the protective gas into said hollow portion.

12. A robot as described in claim 10 wherein said motor includes a port for admitting protective gas from said hollow portion into said gap.

13. A robot as described in claim 10 wherein said motor includes an inner cylinder fixed to the stator and an outer cylinder fixed to the rotor, and bearings supporting the inner and outer cylinders such that the outer cylinder can freely rotate with respect to the inner cylinder, said motor including sealing means which seal off said bearings with respect to said stator and rotor.

14. A robot as described in claim 10 wherein said means for exhausting includes an exhaust tube connected to said motor adjacent to said gap for exhausting protective gas from said gap.

* * * * *